(12) United States Patent
Scalisi et al.

(10) Patent No.: US 10,043,332 B2
(45) Date of Patent: Aug. 7, 2018

(54) DOORBELL PACKAGE DETECTION SYSTEMS AND METHODS

(71) Applicant: SkyBell Technologies, Inc., Irvine, CA (US)

(72) Inventors: Joseph Frank Scalisi, Yorba Linda, CA (US); Andrew Paul Thomas, San Francisco, CA (US); Gregory Saul Harrison, Aliso Viejo, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 15/793,552

(22) Filed: Oct. 25, 2017

(65) Prior Publication Data

US 2018/0061164 A1    Mar. 1, 2018

Related U.S. Application Data

(63) Continuation-in-part of application No. 15/341,125, filed on Nov. 2, 2016, which is a continuation-in-part of application No. 15/167,831, filed on May 27, 2016, now Pat. No. 9,508,239.

(60) Provisional application No. 62/571,465, filed on Oct. 12, 2017.

(51) Int. Cl.
| | |
|---|---|
| G07C 9/00 | (2006.01) |
| H04N 7/18 | (2006.01) |
| G06Q 50/28 | (2012.01) |
| G06K 9/00 | (2006.01) |

(52) U.S. Cl.
CPC ...... *G07C 9/00896* (2013.01); *G07C 9/00111* (2013.01); *G07C 9/00309* (2013.01); *G06K 9/00771* (2013.01); *G06Q 50/28* (2013.01); *G07C 2009/0092* (2013.01); *G07C 2009/00396* (2013.01); *H04N 7/186* (2013.01)

(58) Field of Classification Search
None
See application file for complete search history.

(56) References Cited

U.S. PATENT DOCUMENTS

| | | |
|---|---|---|
| 3,708,742 A | 1/1973 | Gunn |
| 4,523,193 A | 6/1985 | Levinson |
| D283,130 S | 3/1986 | Boenning |
| D297,222 S | 8/1988 | Rauch |

(Continued)

FOREIGN PATENT DOCUMENTS

| | | |
|---|---|---|
| CN | 1902609 | 1/2007 |
| CN | 202872976 | 4/2013 |

(Continued)

OTHER PUBLICATIONS

Doorbot—Downloaded on Nov. 18, 2013 from http://www.craigncompany.com/home-tech-doorbot/; prior art publication at least as of Jun. 10, 2013.

(Continued)

*Primary Examiner* — Anand S Rao
*Assistant Examiner* — Samuel D Fereja

(57) ABSTRACT

Delivery parcel detection systems can include a remote computing device and a doorbell configured to detect a delivery parcel. Methods of enabling a door to be unlocked to allow access to a delivery person may include sending a digital key to a remote computing device. Methods may include ways to ensure security of the building.

29 Claims, 25 Drawing Sheets

(56) References Cited

U.S. PATENT DOCUMENTS

| | | |
|---|---|---|
| 4,843,461 A | 6/1989 | Tatsumi |
| 4,982,092 A | 1/1991 | Jehle |
| 5,210,520 A | 5/1993 | Housley |
| 5,428,388 A | 6/1995 | Von Bauer |
| 5,493,618 A | 2/1996 | Stevens |
| 5,521,578 A | 5/1996 | Delvalle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,907,352 A | 5/1999 | Gilley |
| 5,995,139 A | 11/1999 | Chang-Ho |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,542,078 B2 | 4/2003 | Script |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| 6,812,970 B1 | 11/2004 | McBride |
| 6,828,909 B2 | 12/2004 | Script et al. |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,751,285 B1 | 7/2010 | Cain |
| 7,752,070 B2 | 7/2010 | Hatcher |
| 7,956,576 B2 | 6/2011 | Neu |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,057,210 B2 | 6/2015 | Dumas et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,196,104 B2 | 11/2015 | Dumas et al. |
| 9,218,696 B2 | 12/2015 | Dumas et al. |
| 9,336,637 B2 | 5/2016 | Neil et al. |
| 9,584,775 B2 | 2/2017 | Siminoff et al. |
| D788,061 S | 5/2017 | Siminoff |
| D789,404 S | 6/2017 | Modestine et al. |
| D789,820 S | 6/2017 | Siminoff et al. |
| D791,165 S | 7/2017 | Modestine et al. |
| D791,240 S | 7/2017 | Lemberger et al. |
| D791,241 S | 7/2017 | Lemberger et al. |
| D791,243 S | 7/2017 | Loew |
| D791,878 S | 7/2017 | Loew |
| 9,734,675 B2 | 8/2017 | Siminoff |
| D798,177 S | 9/2017 | Siminoff et al. |
| 9,761,092 B2 | 9/2017 | Chen et al. |
| 2001/0010555 A1 | 8/2001 | Driscoll |
| 2001/0022627 A1 | 9/2001 | Bernhardt |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0006528 A1 | 1/2005 | Movsesian |
| 2005/0007451 A1 | 1/2005 | Chiang |
| 2005/0071879 A1 | 3/2005 | Haldavnekar |
| 2005/0046584 A1 | 5/2005 | Breed |
| 2005/0057361 A1 | 5/2005 | Giraldo |
| 2005/0097248 A1 | 5/2005 | Kelley |
| 2005/0116480 A1 | 6/2005 | Deng |
| 2005/0237208 A1 | 10/2005 | Wojcik |
| 2005/0267605 A1 | 12/2005 | Lee |
| 2005/0285934 A1 | 12/2005 | Carter |
| 2005/0285944 A1 | 12/2005 | Wantanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0008081 A1 | 1/2007 | Tylicki |
| 2007/0046442 A1 | 3/2007 | Bartorelli |
| 2007/0109441 A1 | 5/2007 | Cheng |
| 2007/0126574 A1 | 6/2007 | Langer |
| 2007/0146115 A1 | 6/2007 | Roosli |
| 2007/0176778 A1 | 8/2007 | Ando |
| 2007/0194945 A1 | 8/2007 | Atkinson |
| 2007/0216764 A1 | 9/2007 | Kwak |
| 2007/0237358 A1 | 10/2007 | Tseng |
| 2008/0036862 A1 | 2/2008 | Lang |
| 2008/0128586 A1 | 6/2008 | Johnson |
| 2008/0129825 A1 | 6/2008 | Deangelis |
| 2008/0157956 A1 | 7/2008 | Radivojevic |
| 2008/0167072 A1 | 7/2008 | Berstis |
| 2008/0297339 A1 | 7/2008 | Mathews |
| 2008/0198225 A1 | 8/2008 | Gal |
| 2009/0059002 A1 | 3/2009 | Kim |
| 2009/0072963 A1 | 3/2009 | Langer |

(56) References Cited

U.S. PATENT DOCUMENTS

| | | |
|---|---|---|
| 2009/0093235 A1 | 4/2009 | Grealish |
| 2009/0141939 A1 | 6/2009 | Chambers |
| 2009/0207249 A1 | 8/2009 | Erel |
| 2009/0284578 A1 | 11/2009 | Carter |
| 2009/0296641 A1 | 12/2009 | Bienas |
| 2009/0308116 A1 | 12/2009 | Lambrou |
| 2010/0087161 A1 | 4/2010 | Young |
| 2010/0103300 A1 | 4/2010 | Jones |
| 2010/0134072 A1 | 6/2010 | Neu |
| 2010/0141761 A1 | 6/2010 | McCormack |
| 2010/0195810 A1 | 8/2010 | Mota |
| 2010/0245060 A1 | 9/2010 | Tylicki |
| 2010/0276570 A1 | 11/2010 | Moser |
| 2011/0025852 A1 | 2/2011 | Tanaka |
| 2011/0090085 A1 | 4/2011 | Belz |
| 2011/0121940 A1 | 5/2011 | Jones |
| 2011/0156566 A1 | 6/2011 | Chen |
| 2011/0207509 A1 | 8/2011 | Crawford |
| 2011/0221582 A1 | 9/2011 | Chuey |
| 2011/0260880 A1 | 10/2011 | Dean |
| 2011/0287718 A1 | 11/2011 | Abel |
| 2011/0313775 A1 | 12/2011 | Laligand |
| 2012/0011559 A1 | 1/2012 | Miettinen |
| 2012/0027248 A1 | 2/2012 | Feris |
| 2012/0044049 A1 | 2/2012 | Vig |
| 2012/0044050 A1 | 2/2012 | Vig |
| 2012/0044085 A1 | 2/2012 | Hung |
| 2012/0098439 A1 | 4/2012 | Recker |
| 2012/0105631 A1 | 5/2012 | Hutchings |
| 2012/0108215 A1 | 5/2012 | Kameli |
| 2012/0113253 A1 | 5/2012 | Slater |
| 2012/0127308 A1 | 5/2012 | Eldershaw |
| 2012/0280783 A1 | 5/2012 | Gerhardt |
| 2012/0162416 A1 | 6/2012 | Su |
| 2012/0229282 A1 | 9/2012 | Zagami |
| 2012/0230203 A1 | 9/2012 | Casey |
| 2012/0230696 A1 | 9/2012 | Pederson |
| 2012/0262581 A1 | 10/2012 | Carter |
| 2012/0267962 A1 | 10/2012 | Hanchett |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327225 A1 | 12/2012 | Barley |
| 2012/0327246 A1 | 12/2012 | Senior |
| 2013/0020875 A1 | 1/2013 | Wozniak |
| 2013/0039499 A1 | 2/2013 | Patenaude |
| 2013/0045763 A1 | 2/2013 | Ruiz |
| 2013/0057695 A1 | 3/2013 | Huisking |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |
| 2014/0009609 A1 | 1/2014 | Webster |
| 2014/0015967 A1 | 1/2014 | Moore |
| 2014/0077929 A1 | 3/2014 | Dumas et al. |
| 2014/0088761 A1 | 3/2014 | Shamlian |
| 2014/0125754 A1 | 5/2014 | Haywood |
| 2014/0149706 A1 | 5/2014 | Shim |
| 2014/0167676 A1 | 6/2014 | Mack |
| 2014/0253725 A1 | 9/2014 | Hsu |
| 2014/0260449 A1 | 9/2014 | Uyeda |
| 2014/0266669 A1 | 9/2014 | Fadell |
| 2014/0267716 A1 | 9/2014 | Child |
| 2014/0292481 A1 | 10/2014 | Dumas et al. |
| 2014/0368643 A1 | 12/2014 | Siegel |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0092055 A1 | 4/2015 | Scalisi et al. |
| 2015/0112885 A1 | 4/2015 | Fadell |
| 2015/0145991 A1 | 5/2015 | Russell |
| 2015/0156031 A1 | 6/2015 | Fadell |
| 2015/0194839 A1 | 7/2015 | Wojcik |
| 2015/0211259 A1 | 7/2015 | Dumas et al. |
| 2015/0213658 A1 | 7/2015 | Dumas et al. |
| 2015/0312531 A1* | 10/2015 | Samad ................ H04N 7/186 348/143 |
| 2016/0191864 A1 | 6/2016 | Siminoff et al. |
| 2016/0219254 A1 | 7/2016 | Hu et al. |
| 2016/0235236 A1* | 8/2016 | Byers .................. A47G 29/14 |
| 2016/0300187 A1* | 10/2016 | Kashi ................ G06Q 10/0836 |
| 2016/0366373 A1 | 12/2016 | Siminoff et al. |
| 2017/0160137 A1 | 6/2017 | Jeong |
| 2017/0160138 A1 | 6/2017 | Jeong et al. |
| 2017/0160144 A1 | 6/2017 | Jeong |
| 2017/0162225 A1 | 6/2017 | Jeong et al. |
| 2017/0163944 A1 | 6/2017 | Jeong |
| 2017/0251035 A1 | 8/2017 | Siminoff et al. |
| 2017/0251173 A1 | 8/2017 | Siminoff et al. |
| 2017/0251182 A1 | 8/2017 | Siminoff et al. |
| 2017/0272706 A1 | 9/2017 | Jeong |
| 2017/0280112 A1 | 9/2017 | Siminoff |
| 2017/0280565 A1 | 9/2017 | Tso |
| 2017/0294694 A1 | 10/2017 | Tso |

FOREIGN PATENT DOCUMENTS

| | | |
|---|---|---|
| CN | 202939738 | 5/2013 |
| EP | 684743 | 11/1995 |
| GB | 2400958 | 10/2004 |
| WO | 01/93220 | 12/2001 |
| WO | WO2007111802 | 10/2007 |
| WO | WO2014062321 | 4/2014 |
| WO | WO2014107196 | 7/2014 |
| WO | WO2015023737 | 2/2015 |
| WO | WO2016032217 | 3/2016 |

OTHER PUBLICATIONS

Doorbot—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.

Doorbot—Downloaded on Nov. 18, 2013 from http://www.digitaltrends.com/lifestyle/doorbot-camera-see-visitors-smartphone/; prior art publication at least as of Dec. 9, 2012.

Doorbot website—Downloaded on Nov. 18, 2013 from http://www.getdoorbot.com/.

Doorbot users manual—Downloaded on Nov. 18, 2013 from http://static.mydoorbot.com/DoorBot%20Users%20Manual%201.0.pdf.

Doorbot "fact sheet"—Downloaded on Nov. 18, 2013 from http://cdn.shopify.com/s/files/1/0247/6501/files/DoorBotMediaKit.pdf?17037.

Doorbot "features kit"—Downloaded on Nov. 18, 2013 from http://cdn.shopify.com/s/files/1/0247/6501/files/DoorBot_Features_Kit.pdf?17037.

CellNock index page—Originally downloaded on Sep. 23, 2013 from http://cellnock.com/index.html; The website says CellNock is "patent pending".

CellNock about founder page—downloaded on Nov. 18, 2013 from http://cellnock.com/index.html; The website says CellNock is "patent pending".

CellNock learn more page—Downloaded on Nov. 18, 2013 from http://cellnock.com/learn_more.htm; The website says CellNock is "patent pending".

CellNock product page—Downloaded on Nov. 18, 2013 from http://cellnock.com/products.htm; The website says CellNock is "patent pending".

(56) References Cited

OTHER PUBLICATIONS

Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com)—Downloaded on Nov. 18, 2013 from http://www.myskybell.com/.
MySkyBell.com—Part 2 (previously iDoorCam.com)—Downloaded on Nov. 18, 2013 from http://www.myskybell.com/.
MySkyBell.com—Part 3 (previously iDoorCam.com)—Downloaded on Nov. 18, 2013 from http://www.myskybell.com/.
MySkyBell.com—Part 4 (previously iDoorCam.com)—Downloaded on Nov. 18, 2013 from http://www.myskybell.com/.
MySkyBell.com—Part 5 (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
Wireless video doorbell pager—Downloaded on Aug. 9, 2013 from http://www.indiegogo.com/projects/wireless-video-doorbell-pager—4.
Lockitron—Downloaded on Jul. 24, 2013 from https://lockitron.com/preorder.
EyeTalk for home—Downloaded on May 24, 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYI; published at least as early as Apr. 2013.
SmartBell—Downloaded on Dec. 5, 2013 from http://smartbell.co/This_is_smartbell.html.
SmartBell—Downloaded on Dec. 5, 2013 from http://smartbell.co/Tech_specs.html.
SmartBell—Downloaded on Dec. 5, 2013 from http://smartbell.co/FAQ.html.
SmartBell—A Doorbell for Smartphones, published by Scrambled Brains Tech, LLC., Oct. 1, 2013.
August Smart Lock—Part 1—Downloaded on Jun. 10, 2014 from www.August.com.
August Smart Lock—Part 2—Downloaded on Jun. 10, 2014 from www.August.com.
August Smart Lock—Part 3—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—Downloaded on Jul. 15, 2014 from www.tp-link.us.
AC Adapter Spy Camera—Downloaded on Jun. 24, 2014 from ahdcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
iChime Customizable Digital Chime System—Downloaded on Nov. 7, 2014 from http://www.ichime.com/.
Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.
iDoorCam—A Wi-Fi Enabled, Webcam Doorbell—Downloaded on Sep. 3, 2013 from http://www.idoorcam.com/.
Squaritz IDS—Intelligent Doorbell System—Downloaded on Aug. 15, 2013 from http://www.indiegogo.com/projects/squaritz-ids-intelligent-doorbell-system.
Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
DefenDoor by Glate LLC—Downloaded on Dec. 11, 2014 from https://www.kickstarter.com/projects/85455040/defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.

(56) References Cited

OTHER PUBLICATIONS

MyInterCom Video System—Downloaded on Jun. 8, 2015 from http://myintercom.de/en/funktionsweise.
Kochhi's Cobell Wi-Fi Doorbell—Downloaded on Sep. 14, 2015 from http://www.kocchis.com/Cobell_Manual.pdf.
August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-first-nest-home-index/?utm_medium=paid%20social&utm_source=Facebook&utm_campaign=Nest%20Home%20Index&utm_content=Launch%20post.
Engadget—Amazon partners are reportedly exploring in-home deliveries—Downloaded on Oct. 19, 2017 from https://www.engadget.com/2016/09/27/amazon-august-garageio-inhome/; prior art publication at least as of Sep. 27, 2016.
Logitech—Logitech Circle 2—Downloaded on Oct. 19, 2017 from from https://www.logitech.com/en-us/product/circle-2-home-security-camera; prior art publication at least as of Jul. 26, 2017.
NY Times—Was That an Intruder or a Pet? The Security Cams That Can Tell—Downloaded on Oct. 19, 2017 from https://www.nytimes.com/2017/08/09/technology/personaltech/internet-connected-security-cameras-wirecutter.html?rref=collection%2Fsectioncollection%2Fpersonaltech; prior art publication at least as of Aug. 10, 2017.
Samsung Wisenet—SmartCam D1—Downloaded on Oct. 19, 2017 from http://www.wisenetlife.com/en-us/product/SmartCam/SNH-V6435DN;jsessionid=023065D418C9E9CA7335F6D9B4E2C8-DC/faq/currtPg=4; prior art publication at least as of Sep. 23, 2017.
Nortek Control—Go Control: Smart Doorbell Camera—Downloaded on Oct. 19, 2017 from https://www.nortekcontrol.com/pdf/literature/GC-DBC-1-GoControl-Smart-Doorbell-Camera-Spec-Sheet.pdf; prior art publication at least as of Dec. 18, 2016.
HSN—Samsung SmartCam High-Definition Video Doorbell—Downloaded on Oct. 25, 2017 from https://www.hsn.com/products/samsung-smartcam-high-definition-video-doorbell/8534791; prior art publication at least as of Oct. 22, 2017.
Wirecutter—The Best Smart Doorbell Camera—Downloaded on Oct. 25, 2017 from https://thewirecutter.com/reviews/best-smart-doorbell-camera/; prior art publication at least as of Oct. 19, 2017.
Newsday—Google's Nest launches video doorbell, new security system—Downloaded on Oct. 25, 2017 from https://www.newsday.com/lifestyle/google-s-nest-launches-video-doorbell-new-security-system-1.14498694; prior art publication at least as of Oct. 18, 2017.
Vivint—Vivint Doorbell Camera—Downloaded on Oct. 25, 2017 from https://www.vivint.com/products/doorbell-camera; prior art publication at least as of Oct. 9, 2017.
ZD Net—Amazon to develop a smart doorbell to deliver packages inside your home—Downloaded on Oct. 25, 2017 from http://www.zdnet.com/article/amazon-plans-to-develop-smart-doorbell-to-deliver-packages-inside-your-home/; prior art publication at least as of Oct. 11, 2017.
Dealerscope—Petra Named Exclusive Distributor for New Uniden U-Bell DB1 Wireless Video Doorbell—Downloaded on Oct. 25, 2017 from http://www.dealerscope.com/article/petra-named-exclusive-distributor-new-uniden-u-bell-db1-wireless-video-doorbell/; prior art publication at least as of Oct. 3, 2017.
Nest—Say hello to Nest Hello—Downloaded on Oct. 25, 2017 from https://nest.com/blog/2017/09/20/say-hello-to-nest-hello/?utm_campaign=nest%20hello%20preannounce&utm_source=nest%20customers&utm_medium=m-email&utm_content=learn%20more; prior art publication at least as of Sep. 27, 2017.
Indiegogo—Gate: Your Personal Doorman—Downloaded on Oct. 25, 2017 from https://www.indiegogo.com/projects/gate-your-personal-doorman#/; prior art publication at least as of Sep. 25, 2017.
Mashable—Walmart is teaming with a smart lock startup to deliver food straight to your fridge—Downloaded on Oct. 25, 2017 from http://mashable.com/2017/09/24/walmart-smart-lock-grocery-delivery/#7b0i0W4L_mqf; prior art publication at least as of Sep. 24, 2017.
Wired—Review: August Smart Lock—Downloaded on Oct. 25, 2017 from https://www.wired.com/2017/09/review-august-smart-lock/; prior art publication at least as of Sep. 24, 2017.
Amazon—Amazon Key—Downloaded on Oct. 25, 2017 from https://www.amazon.com/b?ie=UTF8&node=17285120011.
Amazon—Amazon Key In-Home Kit includes: Amazon Cloud Cam (Key Edition) indoor security camera and compatible smart lock—Downloaded on Oct. 25, 2017 from https://www.amazon.com/dp/B00KCYQGXE?locationCheckInvoked=1.
Amazon—Amazon Cloud Cam Indoor Security Camera, works with Alexa—Downloaded on Oct. 25, 2017 from https://www.amazon.com/Amazon-Cloud-Indoor-Security-Camera/dp/B01C4UY0JK/ref=sr_tr_1?s=amazon-devices&ie=UTF8&qid=1508945752&sr=1-1&keywords=amazon+cloud+cam.
Best Buy—Vivint Smart Home—Downloaded on Oct. 25, 2017 from https://www.bestbuy.com/site/home-security-solutions/smart-home/pcmcat748302047019.c?id=pcmcat748302047019&ref=P30T29R169&loc=BODY&CampaignID=860152&eut=2387920889; prior art publication at least as of Aug. 25, 2017.
Ring—Chime Pro—Downloaded on Oct. 25, 2017 from https://ring.com/chime-pro; prior art publication at least as of Aug. 23, 2017.
Twice—Samsung Wisenet SmartCam D1 Video Doorbell—Downloaded on Oct. 25, 2017 from http://www.twice.com/news/smart-home/samsung-wisenet-smartcam-d1-video-doorbell/65643; prior art publication at least as of Jul. 31, 2017.
Tech Crunch—Ring adds three connected Spotlight Cams to its Floodlight Cam lineup—Downloaded on Oct. 25, 2017 from https://techcrunch.com/2017/07/31/ring-adds-three-connected-spotlight-cams-to-its-floodlight-cam-lineup/; prior art publication at least as of Aug. 2, 2017.
CNBC—This $200 'smart' doorbell will show you who (or what) is in front of your house at all times—Downloaded on Oct. 25, 2017 from https://www.cnbc.com/2017/07/23/ring-doorbell-2-review.html; prior art publication at least as of Jul. 23, 2017.
Zmodo—Greet Pro with Beam Alert—Downloaded on Oct. 25, 2017 from http://www.zmodo.com/greetpro-1080p-wifi-video-doorbell/.
August—August Doorbell Cam Pro—Downloaded on Oct. 25, 2017 from http://august.com/products/doorbell-camera/?utm_source=Owners+from+Salesforce&utm_campaign=83b33655ed-EMAIL_CAMPAIGN_2017_06_06&utm_medium=email&utm_term=0_15a5cc0eb8-83b33655ed-247286221&mc_cid=83b33655ed&mc_eid=9d1996d140; prior art publication at least as of Jun. 11, 2017.
ATT—August Wi-Fi Doorbell Cam—Downloaded on Oct. 25, 2017 from https://m.att.com/shopmobile/accessories/specialty-items/August_Wi-Fi_Doorbell_Cam/_jcr_content.html?referrer=https%253A%2F%2Fwww.google.com%2F; prior art publication at least as of Jun. 9, 2017.
Indiegogo—Ding, a beautifully simple smart doorbell—Downloaded on Oct. 25, 2017 from https://www.indiegogo.com/projects/ding-a-beautifully-simple-smart-doorbell-home-technology#/; prior art publication at least as of Jun. 5, 2017.
Clare Controls—The Clare Video Doorbell—Downloaded on Oct. 25, 2017 from https://www.clarecontrols.com/video-doorbell; prior art publication at least as of Jun. 1, 2017.
Business Insider—The best security cameras you can buy for your home—Downloaded on Oct. 25, 2017 from http://www.businessinsider.com/best-security-camera-home/#the-best-home-security-camera-for-outdoors-and-indoors-2; prior art publication at least as of May 27, 2017.
Smanos—Smart Video Doorbell—Downloaded on Oct. 25, 2017 from http://www.smanos.com/doorbell; prior art publication at least as of May 22, 2017.
Ring—Downloaded on Oct. 30, 2017 from https://ring.com/products.
Ring—Video Doorbell 2—Downloaded on Oct. 30, 2017 from https://ring.com/video-doorbell-2.

(56) References Cited

OTHER PUBLICATIONS

Ring—Video Doorbell Pro—Downloaded on Oct. 30, 2017 from https://ring.com/video-doorbell-pro.
Ring—Video Doorbell Elite—Downloaded on Oct. 30, 2017 from https://ring.com/video-doorbell-elite.

* cited by examiner

DOORBELL PACKAGE DETECTION SYSTEMS AND METHODS

CROSS-REFERENCE TO RELATED APPLICATIONS

This application claims the benefit of U.S. Provisional Patent Application No. 62/571,465; filed Oct. 12, 2017; and entitled DOORBELL PACKAGE DETECTION SYSTEMS AND METHODS. The entire contents of U.S. Provisional Patent Application No. 62/571,465 are incorporated herein by reference.

This application claims the benefit of and is a continuation-in-part of U.S. Non-Provisional patent application Ser. No. 15/341,125; filed Nov. 2, 2016; entitled DOORBELL COMMUNICATION SYSTEMS AND METHODS. The entire contents of U.S. patent application Ser. No. 15/341,125 are incorporated by reference herein. U.S. Non-Provisional patent application Ser. No. 15/341,125 claims the benefit of and is a continuation-in-part of U.S. Non-Provisional patent application Ser. No. 15/167,831 (issued as U.S. Pat. No. 9,508,239 on Nov. 29, 2016); filed May 27, 2016; entitled DOORBELL PACKAGE DETECTION SYSTEMS AND METHODS. The entire contents of U.S. patent application Ser. No. 15/167,831 are incorporated by reference herein.

The entire contents of the following application are incorporated by reference herein: U.S. Provisional Patent Application No. 62/571,465; filed Oct. 12, 2017; and entitled DOORBELL PACKAGE DETECTION SYSTEMS AND METHODS.

The entire contents of the following application are incorporated by reference herein: U.S. Nonprovisional patent application Ser. No. 15/167,831; filed May 27, 2016; and entitled DOORBELL PACKAGE DETECTION SYSTEMS AND METHODS.

The entire contents of the following application are incorporated by reference herein: U.S. Nonprovisional patent application Ser. No. 15/008,304; filed Jan. 27, 2016; and entitled DOORBELL PACKAGE DETECTION SYSTEMS AND METHODS.

The entire contents of the following application are incorporated by reference herein: U.S. Nonprovisional patent application Ser. No. 14/861,613; filed Sep. 22, 2015; and entitled DOORBELL COMMUNICATION SYSTEMS AND METHODS.

The entire contents of the following application are incorporated by reference herein: U.S. Nonprovisional patent application Ser. No. 14/813,479; filed Jul. 30, 2015; and entitled DOORBELL COMMUNICATION SYSTEMS AND METHODS.

The entire contents of the following application are incorporated by reference herein: U.S. Nonprovisional patent application Ser. No. 14/589,830; filed Jan. 5, 2015; and entitled DOORBELL COMMUNICATION SYSTEMS AND METHODS.

The entire contents of the following application are incorporated by reference herein: U.S. Nonprovisional patent application Ser. No. 14/743,849; filed Jun. 18, 2015; and entitled DOORBELL COMMUNICATION SYSTEMS AND METHODS.

The entire contents of the following applications are incorporated by reference herein: U.S. Nonprovisional patent application Ser. No. 14/612,376; filed Feb. 3, 2015; and entitled DOORBELL COMMUNICATION SYSTEMS AND METHODS; U.S. Nonprovisional patent application Ser. No. 14/502,601; filed Sep. 30, 2014; and entitled DOORBELL COMMUNICATION SYSTEMS AND METHODS; U.S. Nonprovisional patent application Ser. No. 14/492,809; filed Sep. 22, 2014; and entitled DOORBELL COMMUNICATION SYSTEMS AND METHODS; U.S. Nonprovisional patent application Ser. No. 14/275,811; filed May 12, 2014; and entitled DOORBELL COMMUNICATION SYSTEMS AND METHODS; U.S. Nonprovisional patent application Ser. No. 14/142,839; filed Dec. 28, 2013; and entitled DOORBELL COMMUNICATION SYSTEMS AND METHODS; U.S. Nonprovisional patent application Ser. No. 14/099,888; filed Dec. 6, 2013; and entitled DOORBELL COMMUNICATION SYSTEMS AND METHODS; and U.S. Nonprovisional patent application Ser. No. 14/098,772; filed Dec. 6, 2013; and entitled DOORBELL COMMUNICATION SYSTEMS AND METHODS.

The entire contents of the following application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

The entire contents of the following application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

BACKGROUND

Field

Various embodiments disclosed herein relate to doorbells. Certain embodiments relate to doorbell systems that detect packages.

Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

A doorbell chime can be communicatively coupled with a doorbell while the chime is located remotely relative to the doorbell. For example, the doorbell can be coupled to an exterior surface of a building (e.g., near an entryway) and the chime can be coupled to an interior surface of a building.

Delivery parcels (e.g., packages, envelopes) are often left in a publicly accessible entryway of a building. These delivery parcels are sometimes stolen before the rightful owner can pick up the delivery parcels. Thus, there is a need for systems that reduce the likelihood of delivery parcel theft.

SUMMARY

In several embodiments, methods may include using a delivery parcel detection system. The methods may comprise sending a digital key to a remote computing device of a delivery person. The digital key can be configured to enable unlocking a door of a building to which a delivery parcel is addressed. The door may comprise a lock system configured to impede unauthorized entry into the building. Methods may include detecting, by at least one of a doorbell and the lock system, the digital key via a first wireless communication from the remote computing device to at least one of the doorbell and the lock system.

Some embodiments may include unlocking the door to permit the delivery person to place the delivery parcel inside the building in response to detecting the digital key.

In several embodiments, the delivery parcel may include an expected delivery time window. Methods may include sending the digital key to the remote computing device in response to a first time being at least one of within the expected delivery time window and within a predetermined period prior to the expected delivery time window. Methods may include enabling the digital key. Methods may include disabling the digital key in response to a second time being past the expected delivery time window In several embodiments, methods may include receiving, by at least one of the doorbell and the lock system, a delivery parcel identification code of the delivery parcel, and unlocking the door in response to both detecting the digital key and receiving the delivery parcel identification code. Methods may include unlocking the door in response to verifying that the delivery parcel identification code corresponds to an expected delivery time. In some embodiments, methods may include unlocking the door in response to verifying that the delivery parcel identification code corresponds to an expected delivery item.

In several embodiments, methods may include recording a video, by the doorbell, in response to detecting the delivery person and in response to determining that the delivery parcel is an expected delivery item. Methods may include saving the video and labeling the video as a delivery such that the labeling indicates to a doorbell user that the video shows the delivery of at least one item.

In some embodiments, methods may include detecting a first location of the remote computing device and sending the digital key to the remote computing device in response to the first location. Methods may include sending the digital key to the remote computing device in response to the first location being within one mile of at least one of the doorbell and the lock system. Methods may include sending the digital key to the remote computing device in response to the first location being within one hundred yards of at least one of the doorbell and the lock system. In some embodiments, methods may include sending the digital key to the remote computing device in response to the first location being within a direct wireless communication range of at least one of the doorbell and the lock system. The delivery parcel may include an expected delivery time window. Methods can include disabling the digital key in response to a second time being past the expected delivery time window.

In some embodiments, methods may include detecting, by at least one of the doorbell and the lock system, a delivery parcel identification code of the delivery parcel, and unlocking the door in response to both detecting the digital key and detecting the delivery parcel identification code.

In several embodiments, methods may include recording a video by the doorbell, determining that the video shows a delivery, and labeling the video. The labeling can indicate to a doorbell user that the video shows the delivery of at least one item.

In several embodiments, methods may include detecting a first location of a delivery vehicle and sending the digital key to the remote computing device in response to the first location. The delivery vehicle can be configured to transport the remote computing device and the delivery parcel. Methods may include sending the digital key to the remote computing device in response to the first location being within one mile of at least one of the doorbell and the lock system. Methods may include sending the digital key to the remote computing device in response to the first location being within a direct wireless communication range of at least one of the doorbell and the lock system. In some embodiments, the delivery parcel may comprise an expected delivery time window. Methods may include disabling the digital key in response to a second time being past the expected delivery time window.

In some embodiments, methods may include detecting, by at least one of the doorbell and the lock system, a delivery parcel identification code of the delivery parcel, and unlocking the door in response to both detecting the digital key and detecting the delivery parcel identification code.

In some embodiments, methods may include recording a video by the doorbell, determining that the video shows a delivery, and labeling the video such that the labeling indicates to a doorbell user that the video shows the delivery of at least one item.

In several embodiments, the method may include detecting a first identification code from the remote computing device, verifying that the first identification code is indicative of the remote computing device being authorized for deliveries, and sending the digital key to the remote computing device in response to detecting the first identification code and in response to verifying the first identification code. Methods may include detecting the first identification code by at least one of the doorbell and the lock system. The delivery parcel may include an expected delivery time window. Methods may include disabling the digital key in response to a second time being past the expected delivery time window.

In some embodiments, the method includes detecting, by at least one of the doorbell and the lock system, a delivery parcel identification code of the delivery parcel, and unlocking the door in response to both detecting the digital key and detecting the delivery parcel identification code. Methods may include recording a video by the doorbell, determining that the video show a delivery, and labeling the video such that the labeling indicates to a doorbell user that the video shows the delivery of at least one item. Methods may include sending the video to an entity associated with sending the delivery parcel.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
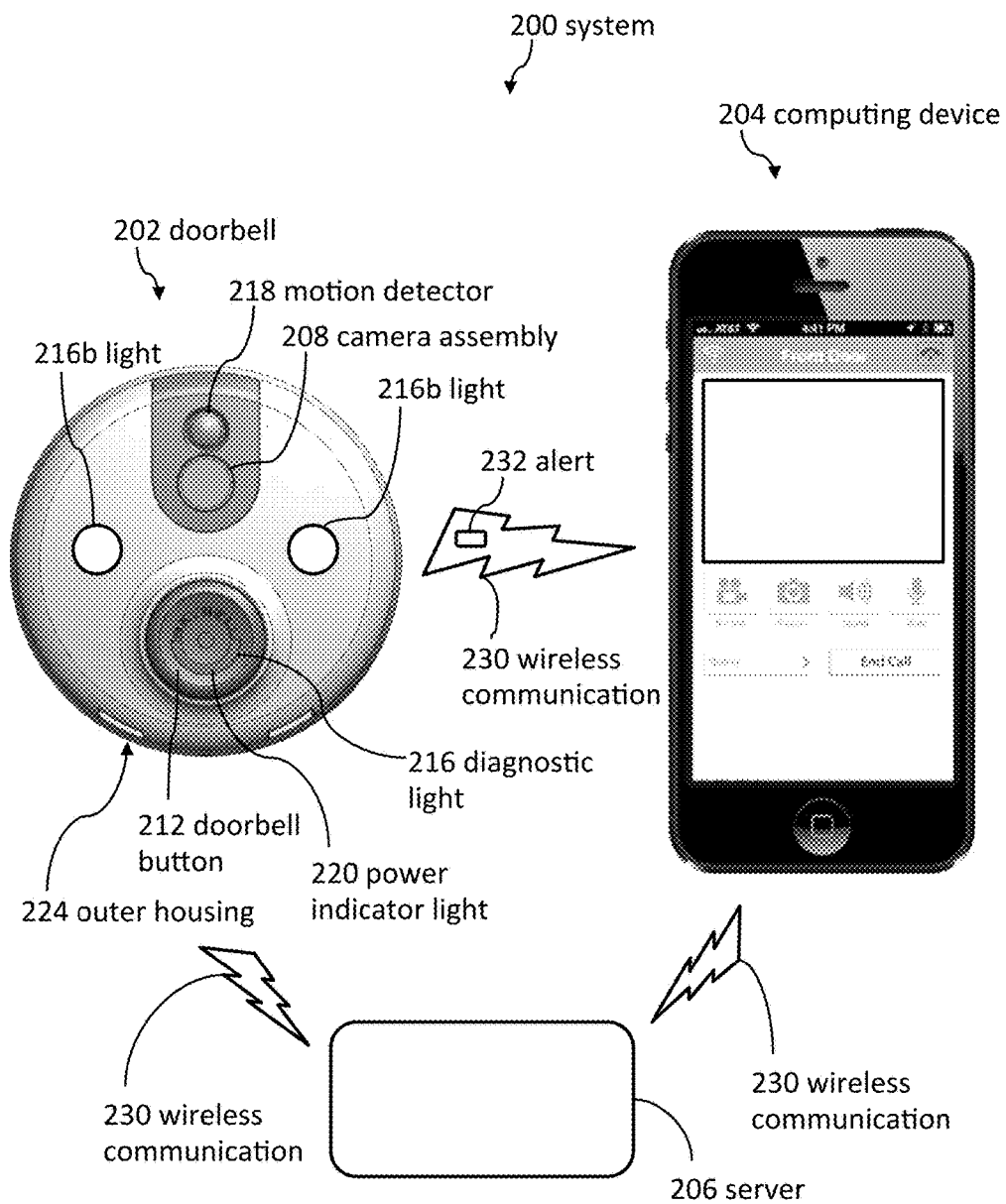
FIG. 1 illustrates a front view of a communication system, according to some embodiments.

Referring now to FIG. 1, the doorbell 202 can record video and audio, which can then be sent to a remote computing device 204. The remote computing device 204 displays the video and emits the audio from the doorbell 202 to enable a user of the remote computing device 204 to see and hear a visitor. For example, when the doorbell 202 detects a visitor (e.g., a motion sensor 218 detects a visitor or the visitor presses the button 212), the doorbell 202 can send a push notification to the remote computing device 204. A user of the remote computing device 204 can then see and hear the visitor.

The user of the remote computing device 204 can select a button on application software running on the remote computing device 204 to initiate two-way audio and/or video communication with the visitor. In some embodiments, the user can see and hear the visitor, and the visitor can hear (but not see the user). In several embodiments, the user can hear (but not see) the visitor. In some embodiments, the user and visitor can both see and hear each other (e.g., the doorbell 202 can include a display screen to show live video captured by a camera of the remote computing device 204).

Doorbell systems can be a portion of a smart home hub. In some embodiments, the doorbell system 200 forms the core of the smart home hub. For example, the various systems described herein enable complete home automation. In some embodiments, the doorbell 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the doorbell 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The doorbell system 200 can include a doorbell 202 (e.g., a security system) and a computing device 204. Although the illustrated doorbell 202 includes many components in one housing, several doorbell embodiments include components in separate housings. The doorbell 202 can include a camera assembly 208 and a doorbell button 212. The camera assembly 208 can include a video camera, which in some embodiments is a webcam. The doorbell 202 can include a diagnostic light 216 and a power indicator light 220. In some embodiments, the diagnostic light 216 is a first color (e.g., blue) if the doorbell 202 and/or the doorbell system 200 is connected to a wireless Internet network and is a second color (e.g., red) if the doorbell 202 and/or the doorbell system 200 is not connected to a wireless Internet network. In some embodiments, the power indicator 220 is a first color if the doorbell 202 is connected to a power source. The power source can be supplied by the building to which the doorbell 202 is attached. In some embodiments, the power indicator 220 is a second color or does not emit light if the doorbell 202 is not connected to the power source.

The doorbell 202 can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The doorbell 202 can be electrically coupled to a power source, such as wires electrically connected to a building's electrical power system. In some embodiments, the doorbell 202 includes a battery for backup and/or primary power.

Wireless communication 230 can enable the doorbell 202 to communicate with the computing device 204. Some embodiments enable communication via cellular networks and/or wireless local area networks ("WiFi"). Some embodiments enable communication via the Internet. Several embodiments enable wired communication between the doorbell 202 and the computing device 204. The wireless communication 230 can comprise the following communication means: radio, WiFi, cellular, Internet, Bluetooth, Bluetooth Low Energy, telecommunication, electromagnetic, infrared, light, sonic, and microwave. Other communication means are used by some embodiments. In some embodiments, such as embodiments that include telecommunication or cellular communication means, the doorbell 202 can initiate voice calls or send text messages to a computing device 204 (e.g., a smartphone, a desktop computer, a tablet computer, a laptop computer).

Several embodiments use near field communication ("NFC") to communicate between the computing device 204 and the doorbell 202. The doorbell 202 and/or the computing device 204 can include a NFC tag. Some NFC technologies include Bluetooth, radio-frequency identification, and quick response codes ("QR codes").

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
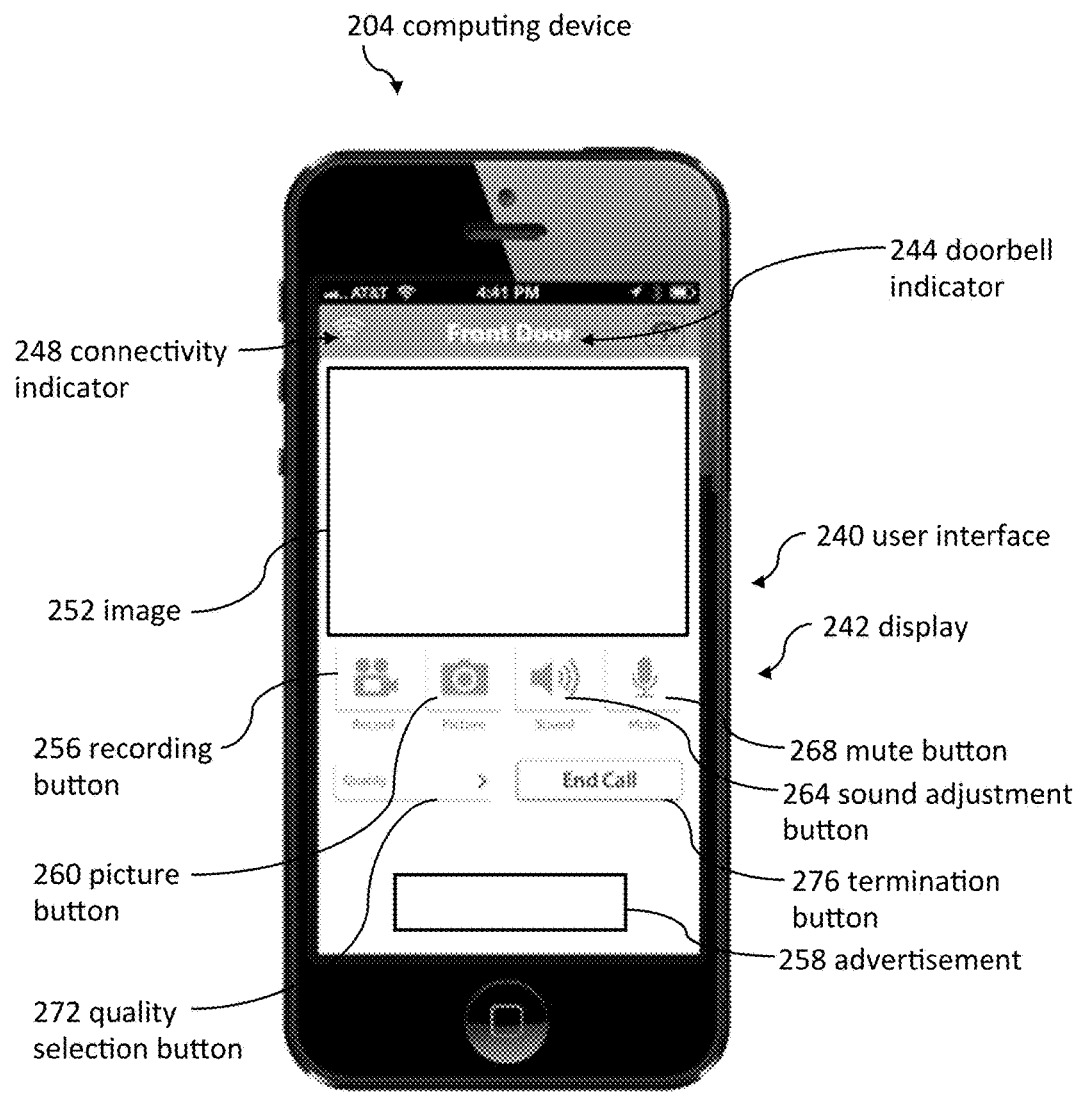
FIG. 2 illustrates a computing device running software, according to some embodiments.

FIG. 2 illustrates a computing device 204 running software. The software includes a user interface 240 displayed on a display screen 242. The user interface 240 can include a doorbell indicator 244, which can indicate the location of the doorbell that the user interface is displaying. For example, a person can use one computing device 204 to control and/or interact with multiple doorbells, such as one doorbell located at a front door and another doorbell located at a back door. Selecting the doorbell indicator 244 can allow the user to choose another doorbell (e.g., a doorbell located by a back door rather than a doorbell located by a front door).

The user interface 240 can include a connectivity indicator 248. In some embodiments, the connectivity indicator 248 can indicate whether the computing device is in communication with a doorbell, the Internet, and/or a cellular network. The connectivity indicator 248 can alert the user if the computing device 204 has lost its connection with the doorbell 202; the doorbell 202 has been damaged; the doorbell 202 has been stolen; the doorbell 202 has been removed from its mounting location; the doorbell 202 has lost electrical power; and/or if the computing device 204 cannot communicate with the doorbell 202. In some embodiments, the connectivity indicator 248 notifies the user of the computing device 204 by flashing, emitting a sound, displaying a message, and/or displaying a symbol.

Referring now to FIG. 1, in some embodiments, if the doorbell 202 loses power, loses connectivity to the computing device 204, loses connectivity to the Internet, and/or loses connectivity to a remote server, a remote server 206 sends an alert 232 (e.g., phone call, text message, image on the user interface 240) regarding the power and/or connectivity issue. In several embodiments, the remote server 206 can manage communication between the doorbell 202 and the computing device 204. In some embodiments, information from the doorbell 202 is stored by the remote server 206. In several embodiments, information from the doorbell 202 is stored by the remote server 206 until the information can be sent to the computing device 204, uploaded to the computing device 204, and/or displayed to the remotely located person via the computing device 204. The remote server 206 can be a computing device that stores information from the doorbell 202 and/or from the computing device 204. In some embodiments, the remote server 206 is located in a data center.

In some embodiments, the computing device 204 and/or the remote server 206 attempts to communicate with the doorbell 202. If the computing device 204 and/or the remote server 206 is unable to communicate with the doorbell 202, the computing device 204 and/or the remote server 206 alerts the remotely located person via the software, phone, text, a displayed message, and/or a website. In some embodiments, the computing device 204 and/or the remote server 206 attempts to communicate with the doorbell 202 periodically; at least every five hours and/or less than every 10 minutes; at least every 24 hours and/or less than every 60 minutes; or at least every hour and/or less than every second.

In some embodiments, the server 206 can initiate communication with the computing device 204 and/or with the doorbell 202. In several embodiments, the server 206 can initiate, control, and/or block communication between the computing device 204 and the doorbell 202. In several embodiments, a user can log in to an "app," website, and/or software on a computing device (e.g., mobile computing device, smartphone, tablet, desktop computer) to adjust the doorbell settings discussed herein.

In some embodiments, a computing device can enable a user to watch live video and/or hear live audio from a doorbell due to the user's request rather than due to actions of a visitor. Some embodiments include a computing device initiating a live video feed (or a video feed that is less than five minutes old).

Referring now to FIGS. 1 and 2, in some embodiments, the user interface 240 displays an image 252 such as a still image or a video of an area near and/or in front of the doorbell 202. The image 252 can be taken by the camera assembly 208 and stored by the doorbell 202, server 206, and/or computing device 204. The user interface 240 can include a recording button 256 to enable a user to record images, videos, and/or sound from the camera assembly 208, microphone of the doorbell 202, and/or microphone of the computing device 204.

In several embodiments, the user interface 240 includes a picture button 260 to allow the user to take still pictures and/or videos of the area near and/or in front of the doorbell 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the doorbell 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button 272, which can allow a user to select the quality and/or amount of the data transmitted from the doorbell 202 to the computing device 204 and/or from the computing device 204 to the doorbell 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the doorbell 202 and the computing device 204. In some embodiments, the termination button 276 ends the ability of the person located near the doorbell 202 (i.e., the visitor) to hear and/or see the user of the computing device 204, but does not end the ability of the user of the computing device 204 to hear and/or see the person located near the doorbell 202.

In some embodiments, a button 276 is both an answer button (to accept a communication request from a visitor) and a termination button (to end communication between the doorbell 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the doorbell and to stop emitting sounds recorded by the doorbell.

In some embodiments, the user interface 240 opens as soon as the doorbell detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a doorbell. The methods can include causing the user interface to display on a remote computing device 204 due to the detection of the visitor (e.g., with or without user interaction). The methods can include displaying video from the doorbell and/or audio from the doorbell before the user accepts two-way communication with the visitor. The methods can include displaying video from the doorbell and/or audio from the doorbell before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the doorbell before opening a means of two-way communication with the visitor.

In some embodiments, the software includes means to start the video feed on demand. For example, a user of the computing device can wonder what is happening near the doorbell 202. The user can open the software application on the computing device 204 and instruct the application to show live video and/or audio from the security device 202 even if no event near the doorbell 202 has triggered the communication.

In several embodiments, the security device 202 can be configured to record when the security device 202 detects movement and/or the presence of a person. The user of the computing device 204 can later review all video and/or audio records from when the security device 202 detected movement and/or the presence of a person.

Referring now to FIG. 1, in some embodiments, the server 206 controls communication between the computing device 204 and the doorbell 202, which can be a doorbell with a camera, a microphone, and a speaker. In several embodiments, the server 206 does not control communication between the computing device 204 and the doorbell 202.

In some embodiments, data captured by the doorbell and/or the computing device 204 (such as videos, pictures, and audio) is stored by another remote device such as the server 206. Cloud storage, enterprise storage, and/or networked enterprise storage can be used to store video, pictures, and/or audio from the doorbell system 200 or from any part of the doorbell system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the doorbell 202 can store information and statistics regarding visitors and usage.

Figure 3:
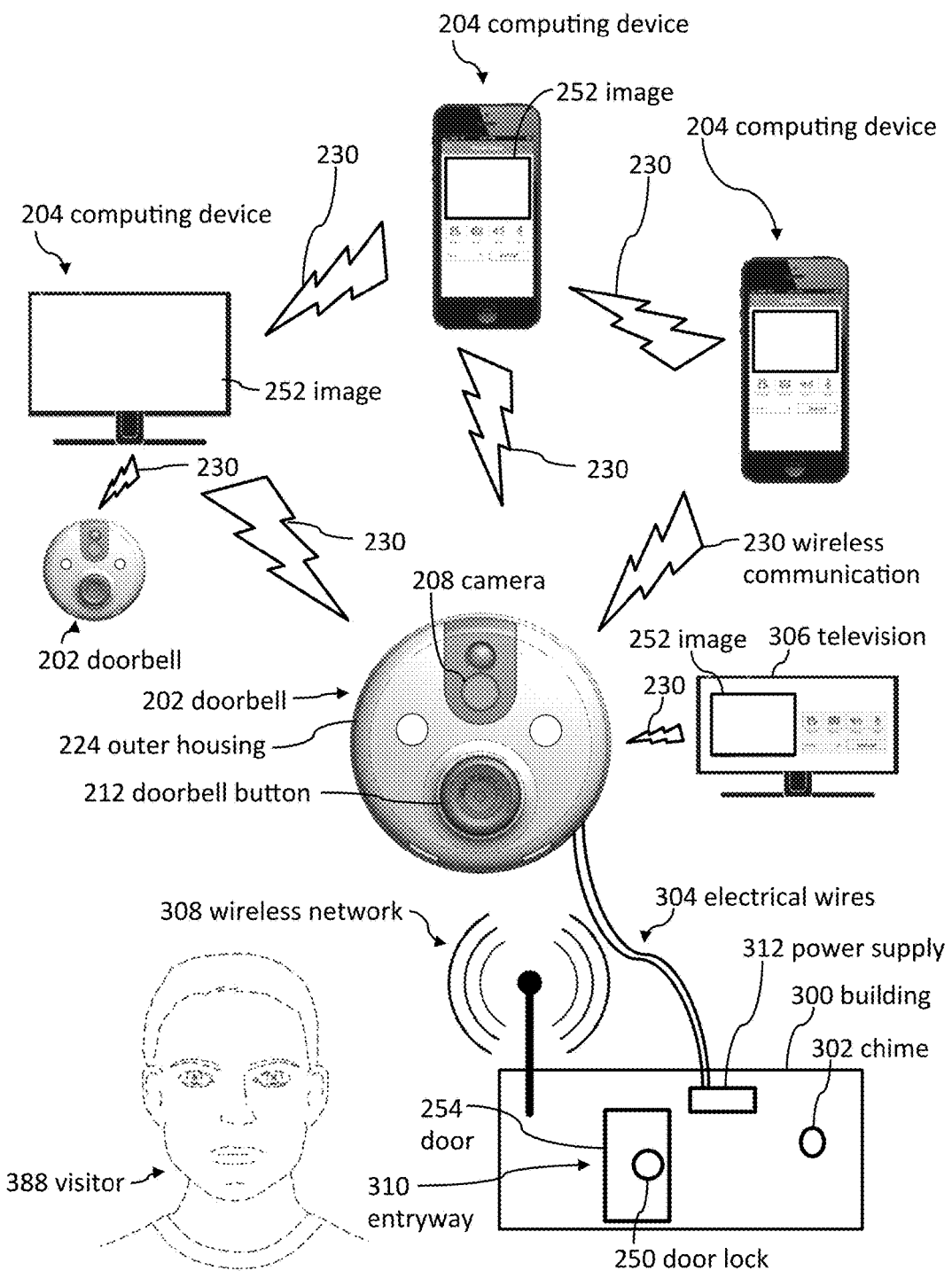
FIG. 3 illustrates a diagrammatic view of multiple computing devices and doorbells, according to some embodiments.

FIG. 3 illustrates an embodiment in which a doorbell 202 is connected to a building 300, which can include an entryway 310 that has a door 254. A visitor 388 can approach the doorbell 202 and then can be detected by the doorbell 202. The visitor 388 can press the doorbell button 212. The user of the doorbell 202 can configure the doorbell 202 such that when the visitor 388 presses the doorbell button 212, the user receives a notification regarding the visitor 388.

Electrical wires 304 can electrically couple the doorbell 202 to the electrical system 312 of the building 300, such that the doorbell 202 can receive electrical power from the building 300. The building can include a door lock 250 to lock the door 254.

A wireless network 308 can allow devices to wirelessly access the Internet. The doorbell 202 can access the Internet via the wireless network 308. The wireless network 308 can transmit data from the doorbell 202 to the Internet, which can transmit the data to remotely located computing devices 204. The Internet and wireless networks can transmit data from remotely located computing devices 204 to the doorbell 202. In some embodiments, a doorbell 202 connects to a home's WiFi.

As illustrated in FIG. 3, multiple computing devices 204 can communicate with one doorbell 202. In some embodiments, one computing device 204 (e.g., a laptop, a smartphone, a mobile computing device, a television) can communicate with multiple doorbells 202.

In some embodiments, the doorbell 202 can communicate (e.g., wirelessly 230) with a television 306, which can be a smart television. Users can view the television 306 to see a visitor and/or talk with the visitor.

Figure 4:
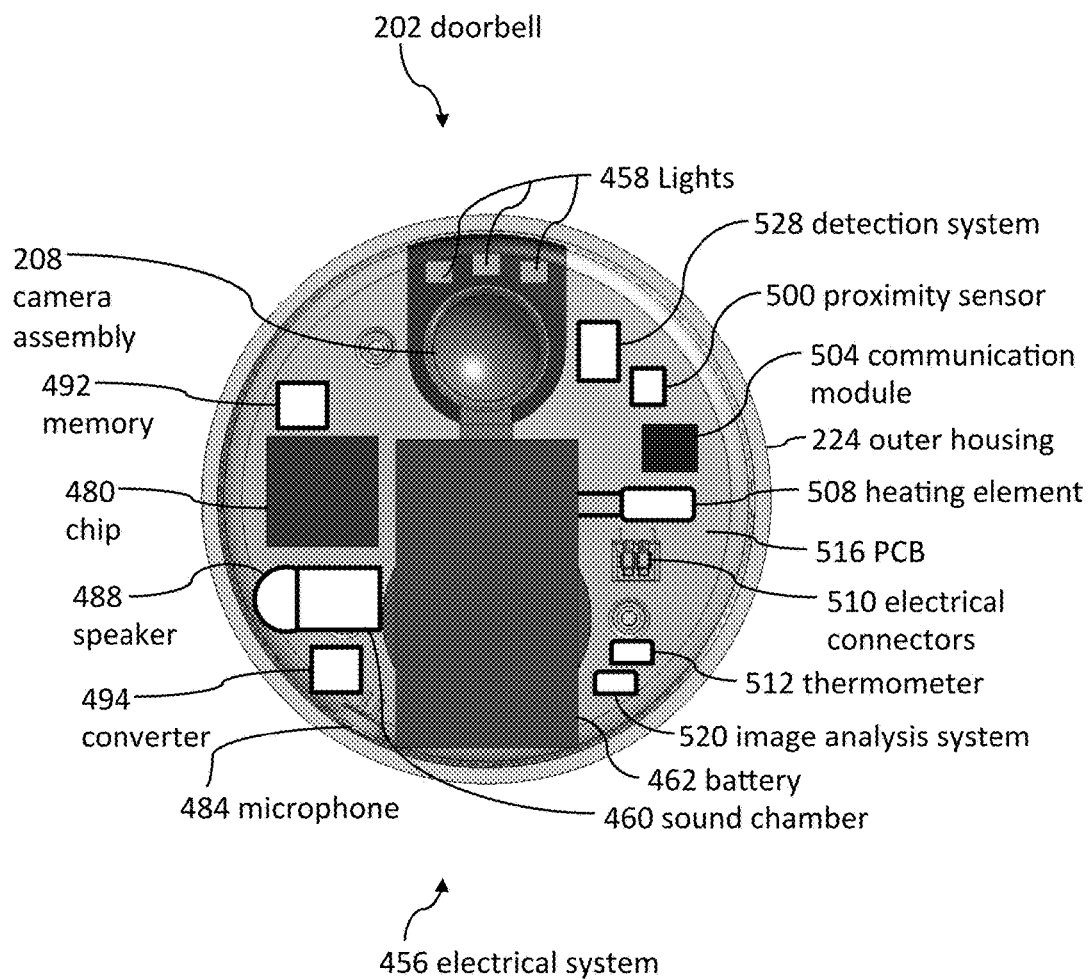
FIG. 4 illustrates a back view of a doorbell without a back cover to show various components of the doorbell's electrical system, according to some embodiments.

FIG. 4 illustrates an internal view of the doorbell 202. Doorbells 202 can include a chip 480 (e.g., integrated circuits, microprocessor, computer) and a memory 492. Doorbells 202 can also include a microphone 484 and a speaker 488. The speaker 488 can comprise a flat speaker and a sound chamber 460 configured to amplify an emitted sound. The flat speaker can be located in the sound chamber. Some doorbell embodiments include a proximity sensor 500. In several embodiments, doorbells 202 include a wireless communication module 504, such as a WiFi module. The communication module 504 can have an integrated antenna. In some embodiments, an antenna is contained within the outer housing 224.

The doorbell 202 can include one or more heating elements 508 configured to regulate the temperature of the doorbell 202. For example, doorbells 202 can be used in very cold environments, such as in Alaska. The heating element 508 can be used in various methods to protect temperature sensitive portions of the doorbell 202 from cold weather.

While protecting the doorbell 202 from cold weather can be important in some embodiments, protecting visitors from excessive heat can also be important in some embodiments. Excessive heat could burn visitors as they "ring" the doorbell (e.g., press the doorbell button 212 shown in FIG. 1). The doorbell 202 can include a thermometer 512 to enable the system to determine the temperature inside a portion of the doorbell 202 and/or outside the doorbell 202.

Several embodiments can be configured for 9 to 40 volts alternating current ("VAC") and/or 9 to 40 volts direct current ("VDC"). Some embodiments convert input electricity into direct current ("DC"), such as 12 VDC. Several embodiments include a converter 494 for power conversion (e.g., converting electrical energy from one form to another). The converter 494 can convert input power (e.g., from wiring in a building) to a suitable power form for the doorbell 202. The power conversion can convert between AC and DC, change the voltage, and/or change the frequency. The converter 494 can include a transformer and/or a voltage regulator. In several embodiments, the converter 494 can include a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

The electrical components of the doorbell 202 (e.g., the camera assembly 208, the memory 492, the chip 480, the speaker 488, the converter 494, the microphone 484, the lights 458, a rectifier, the proximity sensor 500, the communication module 504, the heating element 508, the electrical connectors 510, the thermometer 512, the image analysis system 520, and the battery 462) can be electrically coupled to a printed circuit board ("PCB") 516 and can receive electrical power from the PCB 516.

The PCB 516 and the electrical components of the doorbell 202 can be the electrical system 456 of the doorbell 202. Additional details regarding the PCB 516 and the electrical components of the doorbell 202 are described in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

The doorbell 202 can include a detection system 528. The doorbell 202 may be configured to alert the user to the presence of a visitor 388 by, for example, sounding a chime 302.

Although some embodiments are described in the context of devices and systems, the device embodiments and the system embodiments can also be formulated as methods. Devices and systems described herein can be applied to the methods incorporated by references herein.

Although some embodiments are described in the context of methods, the method embodiments can also be formulated as devices and systems. Methods described herein can be applied to the devices and systems incorporated by references herein.

Doorbell Package Detection Embodiments

Millions of parcels are delivered each week. Often, these parcels are delivered during working hours when the homeowner is away at work. When the parcels are too large to fit in a mailbox, mail carriers and other delivery personnel often leave the parcels on a front porch of the home or even in a common area of an apartment building.

These parcels can sit unattended for long periods of time. Thieves see unattended parcels as soft targets and often drive around neighborhoods looking for unattended parcels. Thieves can jump out of a car, steal the parcel, and then drive away within seconds. With shopping being done increasingly online and the resulting increase in parcel deliveries, parcel theft is becoming more and more of a problem. Until now, little has been done to combat parcel theft.

Embodiments described herein include high-tech floor coverings (e.g., mats) that can communicate wirelessly with a smart doorbell. The floor coverings can include sensors, such as pressure sensors and optical sensors, to detect when a parcel (e.g., a package, an envelope) is placed on the floor covering.

The floor covering can "wake up" the smart doorbell by sending a wireless communication (e.g., via Bluetooth Low Energy) to the doorbell. The doorbell can then send an alert to a remote computing device (e.g., a smartphone) to alert the user regarding the arrival or removal of the delivery parcel.

If the doorbell's motion sensor and/or camera detects a visitor when a delivery parcel is located on the floor covering, the doorbell can start recording a video. If the visitor takes the delivery parcel, then the video will document who took the delivery parcel. If the system senses that the visitor removed the delivery parcel from the floor covering, the system can send an alert (e.g., a push notification) to the remote computing device. This alert can include the video.

The system can recognize when a delivery parcel has arrived via image recognition. The system can create a security zone around the delivery parcel. If a visitor enters the security zone, the system can send an alert to the remote computing device and/or emit lights and sounds (e.g., from the doorbell, from the floor covering). This security zone can be a portion of the field of the view of the camera.

Figure 5:
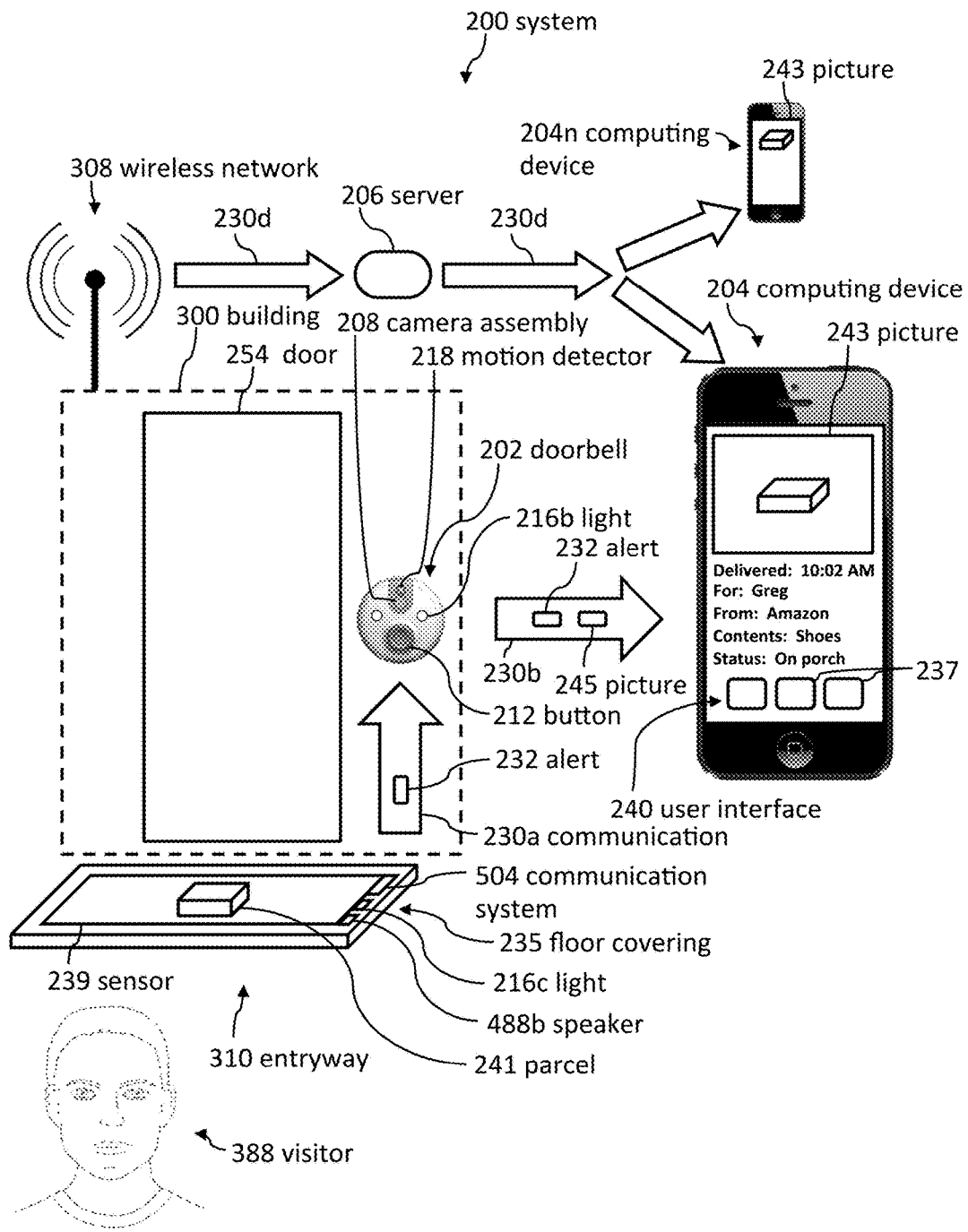
FIGS. 5 and 6 illustrate diagrammatic views of a doorbell system that can use a floor covering to detect parcels, according to some embodiments.

FIG. 5 illustrates a diagrammatic view of a delivery parcel detection system 200. A doorbell 202 is mounted to an exterior of a building 300 (e.g., in an entryway 310 near a door 254). The doorbell 202 can include a camera assembly 208 and a motion detector 218. The camera assembly 208 and the motion detector 218 can detect when a visitor 388 approaches the doorbell 202. This configuration enables the doorbell 202 to monitor the delivery parcel 241, which can be located in the entryway 310.

The floor covering 235 can communicate with the doorbell 202 (e.g., can send information to the doorbell 202). In some embodiments, the floor covering 235 is communicatively coupled (e.g., wirelessly coupled) to a wireless network 308 (e.g., of the building 300). The doorbell 202 can be communicatively coupled to the same wireless network 308 as the floor covering 235.

In several embodiments, the floor covering 235 communicates directly (via wires or wirelessly) with the doorbell 202. For example, Bluetooth, Bluetooth Low Energy, radio waves, and/or any suitable short-range communication system or protocol can be used by the communication system 504b of the floor covering 235 to enable the floor covering 235 to communicate with the doorbell 202.

The doorbell 202 can communicate with a remote computing device 204, which can be located inside the building 300, outside the building 300, or even many miles away from the building 300. The doorbell 202 can be communicatively coupled with the remote computing device 204 via the wireless network 308, the Internet, cellular networks, telecommunication networks, the server 206, and/or any other suitable system.

The delivery parcel 241 is located on top of a floor covering 235, which can be a mat. As used herein, the term "delivery parcel" is used broadly and can mean a box or envelope that is usually given, sent, or delivered to a person. For example, a mail carrier, a FedEx Corporation delivery worker, and any suitable delivery service can place a delivery parcel 241 near the building 300. In some cases, a friend or neighbor places a delivery parcel 241 near the building 300 (e.g., on the floor covering 235). Delivery parcels 241 can be large boxes, small boxes, odd-shaped packages, large envelopes, small envelopes, and/or any object that is placed on the floor covering 235.

As used herein, the term "floor covering" is used broadly. Floor coverings are configured for placing on the ground. Floor coverings can be mats. Mats can have a length and width that are more than ten times their thickness, which is measured vertically upward when the mat is placed on the ground. In some embodiments, mats can be used to wiping soiled shoe soles; however, not all mats are used for wiping shoe soles. For example, mats can be specially designed such that a delivery person can place parcels on the mats. Mats can be made of fabric or can be molded from plastic.

In FIG. 5, the floor covering 235 is located directly in front of the door 254, but in several embodiments, the floor covering 235 is located on the ground to the side of the door 254 to discourage visitors 388 from stepping on the floor covering 235.

The floor covering 235 can include sensors 239 to detect whether a delivery parcel 241 is located on the floor covering 235. In some embodiments, these sensors 239 are pressure sensors.

The pressure sensors can be thin and flexible. Tekscan, Inc., having an office in South Boston, Mass., makes high resolution pressure sensors that can be embedded in floor coverings 235. The nature of Tekscan's pressure sensors enables the system 200 to detect the footprint and the weight of the delivery parcel 241. This information can be compared to a database of parcels that are expected to be delivered to the address at which the floor covering 235 is located. This comparison enables the system 200 to determine which expected parcel has a footprint and/or weight indicative of being the parcel 239 located on the floor covering 235. The communication 230b to the remote computing device 204 can then include information regarding the contents of the parcel 241.

Digi-Key Corporation, having an office in Thief River Falls, Minn., sells many types of pressure sensors that can be embedded into the floor covering 235. Digi-Key sells pressure sensors from Freescale Semiconductor, Inc. that can be mounted to a PCB of the floor covering 235. Digi-Key also sells pressure sensors from STMicroelectronics N.V. that can be surface mounted on the floor covering 235.

In several embodiments, floor covering 235 comprises sensors 239 that are optical sensors. For example, the optical sensors can include light emitting diodes ("LEDs") that emit light upwards (away from the ground). The optical sensors can also include light sensors configured to detect the light from the LEDs. The optical sensors can face upwards. If no object is located on top of the floor covering 235, the light from the LEDs simply continues upward and is not sensed by the light sensors. If an object is located on top of the floor covering 235, the light from the LEDs can reflect off the object such that the light is redirected back towards the light sensors. As a result, the light sensors can detect the object (e.g., a delivery parcel).

A light sensor can be located in the same upward facing hole as an LED, such that the light sensor is configured to detect light emitted from the LED if a delivery parcel covers the hole to deflect the light emitted from the LED towards the light sensor. The light sensor can be configured to only detect a specific type of light emitted by the LED, such that the sensor system does not confuse the presence or lack of sunlight as the presence or removal of a delivery parcel.

As shown in FIG. 5, a delivery parcel detection system 200 can include a doorbell 202 having a first wireless communication system 504 (shown in FIG. 4); and a floor covering 235 configured for placement on the ground (e.g., an entryway floor). The floor covering 235 can comprise a sensor 239 configured to detect a first indication of a delivery parcel 124 on the floor covering 235. The floor covering 235 is communicatively coupled to the doorbell 202 (e.g., via wires or wirelessly). The doorbell 202 can be mounted to a wall of the building 300 while the floor covering is located on the ground. The floor covering 235 can be a mat that includes a battery to provide electrical power to electrical components of the floor covering 235.

The system 200 can include a first communication 230a (e.g., a Bluetooth wireless communication) sent from the floor covering 235 to the doorbell 202 in response to the floor covering 235 detecting the first indication of the delivery parcel 241. The system 200 can also include a second communication 230b (e.g., a wireless communication) sent from the doorbell 202 to a remote computing device 204 in response to the doorbell 202 receiving the first communication 230a.

The doorbell 202 can include a camera 208. The second communication 230b can comprise a first picture 243 taken by the doorbell 202, such that the doorbell 202 is configured to send the first picture 243 to the remote computing device 204 in response to the floor covering 235 detecting the first indication of the delivery parcel 241. As illustrated in FIG. 5, the first picture 243 can show the delivery parcel 241 to enable the user of the remote computing device 204 to see the delivery parcel 241. The first picture 243 can be sent directly from the doorbell 202 to the computing device 204, but in many embodiments, the first picture 243 is sent from the doorbell 202 to the remote computing device 204 indirectly (e.g., via a server 206).

The first indication of the delivery parcel 241 can be a weight of the delivery parcel 241 sensed by the floor covering 235 (e.g., via a pressure sensor). The first indication of the delivery parcel 241 can also be a light sensed by a light sensor (e.g., as described above). The first indication can be due to the arrival of the delivery parcel (e.g., a pressure increase, a light increase) or can be due to a removal of the delivery parcel from the floor covering 235 (e.g., a pressure decrease, a light decrease).

The first indication can be associated with an arrival of the delivery parcel 241 to the floor covering 235. The first indication can be associated with a removal of the delivery parcel 241 from the floor covering 235. The communication 230b sent to the remote computing device 204 can indicate if the delivery parcel 241 arrived or was removed.

The system 200 can also comprise a first alert 232 regarding the delivery parcel 241. In some embodiments, the first alert is a push notification sent to the remote computing device 204 (e.g., sent wirelessly over various communication networks, sent via WiFi). The first alert 232 can be a text message on the remote computing device. The first alert 232 can be a graphic displayed on the screen of the remote computing device 204. The graphic can be configured to enable a user of the remote computing device 204 to see information regarding the delivery parcel (e.g., a picture of the parcel, a time of parcel arrival, a time of parcel removal, an identity of the person who delivered the parcel, an identity of the person who removed the parcel).

The first alert 232 can be displayed on the remote computing device 204 in response to the remote computing device 204 receiving the second communication 230b from the doorbell 202. The system 200 can include a graphical user interface 240 displayed on the remote computing device 204. The graphical user interface 240 can be configured to display information regarding the delivery parcel 241.

This information regarding the delivery parcel 241 can be displayed simultaneously with weather information (e.g., as detected by the system 200) described in U.S. Nonprovisional patent application Ser. No. 14/813,479; filed Jul. 30, 2015; and entitled DOORBELL COMMUNICATION SYSTEMS AND METHODS, which is incorporated by references herein. For example, the display can show information such as, "your package is outside in the rain" or "wind of 25 miles per hour is blowing your mail away."

As shown in FIG. 5, the graphical user interface shows a picture 243 of the delivery parcel 241. The graphical user interface 240 can display the following information, and any other relevant information, regarding the delivery parcel 241: delivery time, to whom the delivery parcel is addressed, sender information, contents, and the status. The status can indicate whether the delivery parcel 241 is currently located on the floor covering 235. The status can also indicate if the delivery parcel 241 is still within a detection range (e.g., a field of view of the camera 208) of the doorbell 202.

The graphical user interface 240 is configured to enable changing at least one setting of the lights 216b of the doorbell 202. The user interface 240 can include buttons 237 (e.g., touch screen icons, which are not necessarily physical buttons). At least one of these buttons 237 can be a light adjustment button configured to enable changing settings of a light 216b (e.g., an LED) of the doorbell 202.

The setting that is changed by the button 237 can be a color of the light 216b. For example, the color can change from red to green to blue to white. Millions of color combinations are possible with LEDs. The color can correspond with holiday colors or special occasions. The setting that is changed by the button 237 can be a brightness of the light 216b. For example, the button 237 can act as a light dimmer.

In some embodiments, the system 200 automatically changes the setting in response to the floor covering 235 detecting the first indication of the delivery parcel 241. For example, parcel 241 removal can cause a red light to flash from the doorbell 202 and/or from the floor covering 235. Parcel 241 arrival can cause a green light to flash.

In several embodiments, the system 200 (e.g., the doorbell) emits a sound or audible words in response to detecting the arrival or removal of the parcel 241. The sound and/or words can thank the deliver and/or warn the remover.

Many types of warning sounds be can emitted from the doorbell 202 (e.g., from the speaker 488 shown in FIG. 4) in response to the system 200 detecting a removal of the delivery parcel 241 from the floor covering 235. The floor covering 235 can also emit the warning sound from a speaker 488b. The warning sound can be a voice saying a predetermined message such as, "stop, package theft is against the law." Reduced pressure, as sensed by the floor covering 235, can enable the system 200 to detect the removal of the parcel 241.

In addition to having a speaker 488b, the floor covering 235 can also include many warning lights 216c, which can be LEDs. In several embodiments, a warning light and a warning sound are emitted from at least one of the doorbell 202 and the floor covering 235 in response to the system 200 detecting motion (e.g., via the motion detector 218).

In some embodiments, a warning light and a warning sound are emitted from at least one of the doorbell 202 and the floor covering 235 in response to the system 200 detecting that an object (e.g., a visitor 388) has moved into a field of view of a camera 208 of the doorbell 202. For example, if a visitor 388 approaches the doorbell 202 and/or the floor covering 235 while a parcel 241 is located on the floor covering 235 and/or detected by the doorbell 202, the doorbell 202 and/or the floor covering 235 can emit the warning light from the lights 216b, 216c and can emit the warning sounds from the speakers 488b, 488 (shown in FIG. 4). Thus, the system 200 can emit the warnings in response to motion and/or object detection plus in response to the system 200 determining the delivery parcel 241 is located on the floor covering 235.

In some embodiments, the system 200 is configured to not emit a warning if a person carrying the remote computing device 204 is the one removing the parcel 241. In contrast, if a person is removing the parcel 241 when the remote computing device 204 is located far from the doorbell 202 (e.g., is away from home), then the person removing the parcel 241 can be a thief. Thus, some embodiments include a warning light and a warning sound emitted from at least one of the doorbell 202 and the floor covering 235 in response to the system 200 detecting a removal of the delivery parcel 241 from the floor covering 235 during a period when the system has determined that the remote computing device 204 is at least one of not located within a predetermined distance of the doorbell 202 and not located within a detection range of the doorbell 202. The predetermined distance can be within 30 meters of the doorbell 202.

The system 200 can determine if the computing device 204 is within a predetermined distance based on Global Positioning System ("GPS") information from the doorbell 202 and the remote computing device 204. The system 200 can determine if the remote computing device 204 is within a detection range of the doorbell 202 via the doorbell 202 trying to communicate with the remote computing device 204 directly via a short-range communication protocol such as Bluetooth. If the remote computing device 204 does not respond to the Bluetooth signal from the doorbell 202, then the system 200 determines that the remote computing device 204 is outside of the detection range of the doorbell 202.

Doorbell 202 power consumption minimization can be important, especially in embodiments in which the doorbell 202 is powered exclusively via battery power (rather than via electrical wires 304 from a building 300 as shown in FIG. 3). In some embodiments, the doorbell 202 is in a Sleep Mode that precludes the camera 208 from recording without exiting the Sleep Mode. The floor covering 235 detecting parcel 241 delivery, movement, or removal can cause the doorbell 202 to exit the sleep mode, take a picture, and/or start recording a video. The picture and video can be sent to the server 206 and/or to the remote computing device 204. In some embodiments, the doorbell 202 comprises an electrical power consumption rate that increases in response to the floor covering 235 detecting the first indication of the delivery parcel 241 (e.g., due to the activity of the camera 208).

In several embodiments, the doorbell 202 comprises a camera 208 configured to take at least one picture in response to the floor covering 235 detecting the first indication of the delivery parcel 241. The sensor 239 can comprise a pressure sensor configured such that placing the delivery parcel 241 on the floor covering 235 enables the pressure sensor to detect the first indication.

A camera 208 can be electrically coupled to the doorbell 202. The camera 208 can also be electrically coupled to the floor covering 235. The system 200 can comprise a video taken by the camera 208 in response to the system detecting a removal of the delivery parcel 241. A video can be taken by the camera 208 in response to the camera 208 detecting an object (e.g., a visitor 388) that has moved into a field of view of the camera 208 during a period when the system 200 has determined the delivery parcel 241 is located on the floor covering 235.

The doorbell 202 can include a motion detector 218. The floor covering can also include a motion detector 218, which can have all the same features and functions of the motion detector 218 of the doorbell 202. In some embodiments, a motion detector 218 and a camera 208 are electrically coupled to at least one of the doorbell 202 and the floor covering 235. The system 200 can comprise a video taken by the camera 208 in response to the motion detector 218 detecting a motion indication during a period when the system 200 has determined the delivery parcel 241 is located on the floor covering 235. A second communication 230b can be sent from the doorbell 202 to the remote computing device 204 in response to the motion detector 218 detecting the motion indication. The second communication 230b can comprise the video.

In several embodiments, the first indication is associated with a removal of the delivery parcel 241 from the floor covering 235. The system can further comprise a first communication 230a sent from the floor covering 235 to the doorbell 202 in response to the floor covering 235 detecting the first indication. The system can also comprise a second communication 230b sent from the doorbell 202 to a remote computing device 204 in response to the doorbell 202 receiving the first communication 230a. As described previously, a camera 208 can be electrically coupled to at least one of the doorbell 202 and the floor covering 235. The second communication 230b can comprise a picture taken by the camera 208 within five seconds of the sensor 239 detecting the first indication. Taking the picture within five seconds can help ensure the picture (which can be a video) shows the thief who removed the parcel 241 (via the system 200 taking the picture before the thief is able to run away).

The system 200 can take pictures 245 when the system 200 detects the arrival of the parcel 241, a visitor 388 moving (e.g., towards the doorbell 202), a movement of the parcel 241, and/or the removal of the parcel 241. The communication 230b between the doorbell 202 and the remote computing device 204 can include these pictures 245. Thus, the system 200 can send many pictures to the remote computing device 204 depending on the preferences of the user of the remote computing device 204. As used herein, sending a video includes sending a picture (because a picture is a portion of a video). Thus, a picture can be a still picture and can be an instant of a video (e.g., can be one frame of a video).

A doorbell communication 230d regarding the parcel 241 can be sent via a wireless network 308 (e.g., of the building 300), via Bluetooth, via cellular networks, via telecommunication networks, via the Internet, and/or via a server 206 to the remote computing device 204. In some embodiments, another remote computing device 204n also receives the doorbell communication 230d regarding the parcel 241. The doorbell communication 230d can include a picture 243 of the parcel 241 and/or a picture 243 taken by a camera 208, 208b of the system 200 at a time within 5 seconds of the doorbell 202 and/or the floor covering 235 detecting of an indication of the parcel 241 (e.g., an arrival of the parcel 241, a movement of the parcel 241, and/or a removal of the parcel 241 from the floor covering 235 and/or from a field of view of the doorbell 202).

In some embodiments, the second remote computing device 204n is a neighbor's remote computing device. The doorbell communication 230d can include a request for the neighbor to pick up and move the parcel 241. In response to this request, the neighbor can bring the parcel 241 to the neighbor's home to prevent the parcel 241 from being stolen until the parcel's owner can get the parcel 241 from the neighbor.

Some embodiments of the system 200 use the floor covering 235 to detect parcels 241. Some embodiments of the system 200, however, do not use the floor covering 235 to detect parcels 241. For example, the doorbell 202 can use the camera 208 to detect parcels 241.

The doorbell 202 can use the camera 208 to take a picture 243 when the doorbell 202 detects movement (via the camera 208 and/or via the motion detector 218). The system 200 can then analyze the picture 243 to determine if the picture 243 shows a parcel 241. This picture analysis can use image recognition procedures to look for indications of a parcel 241 in the picture 243. For example, the image recognition procedure can include looking for colors that are typical of cardboard delivery boxes (e.g., brown). The image recognition procedure can include looking for flat surfaces connected at approximately ninety degree angles (which are indicative of a box shape). The image recognition procedure can include looking for flat surfaces located in different locations in images taken at different times (which is indicative of a box being carried towards the doorbell 202 such that the box is located in a first position in a first picture and is located in a second position in a second picture taken within 10 seconds of the first picture).

The parcel 241 detection procedure can also include using the microphone 484 (shown in FIG. 4) of the doorbell 202 to listen for sounds indicative of delivery vehicles (e.g., the sounds of large engines and heavy trucks typical of delivery services such as FedEx Corporation and United Parcel Service, Inc.). The system 200 can also use the microphone 484 to listen for sounds indicative of a parcel 241 being dropped on a floor (e.g., of an entryway 310). The system 200 can then analyze the sounds to identify that the parcel 241 has been delivered to the building 300 (e.g., the parcel 241 is located outside of the building 300 within a detection range of the doorbell 202).

The system 200 can hear a delivery vehicle stop within a detection range of the doorbell 202 (e.g., within a range that the microphone 484 can hear the delivery vehicle). However, the system 200 can not know if the delivery vehicle left a parcel 241 at the building 300 or at a neighbor's home. The system 200 can distinguish between deliveries to neighbors' homes and deliveries to the building 300 by identifying a parcel delivery in response to detecting movement (via the camera 208 and/or via the motion detector 218) within 30 seconds of detecting sounds indicative of a delivery vehicle.

In FIG. 5 illustrates a perspective view of the floor covering 235. The view of FIG. 5 shows a front view of the door 254. FIG. 5 is a view that a visitor 388 typically sees as she walks towards a door 254 of a home.

Figure 6:
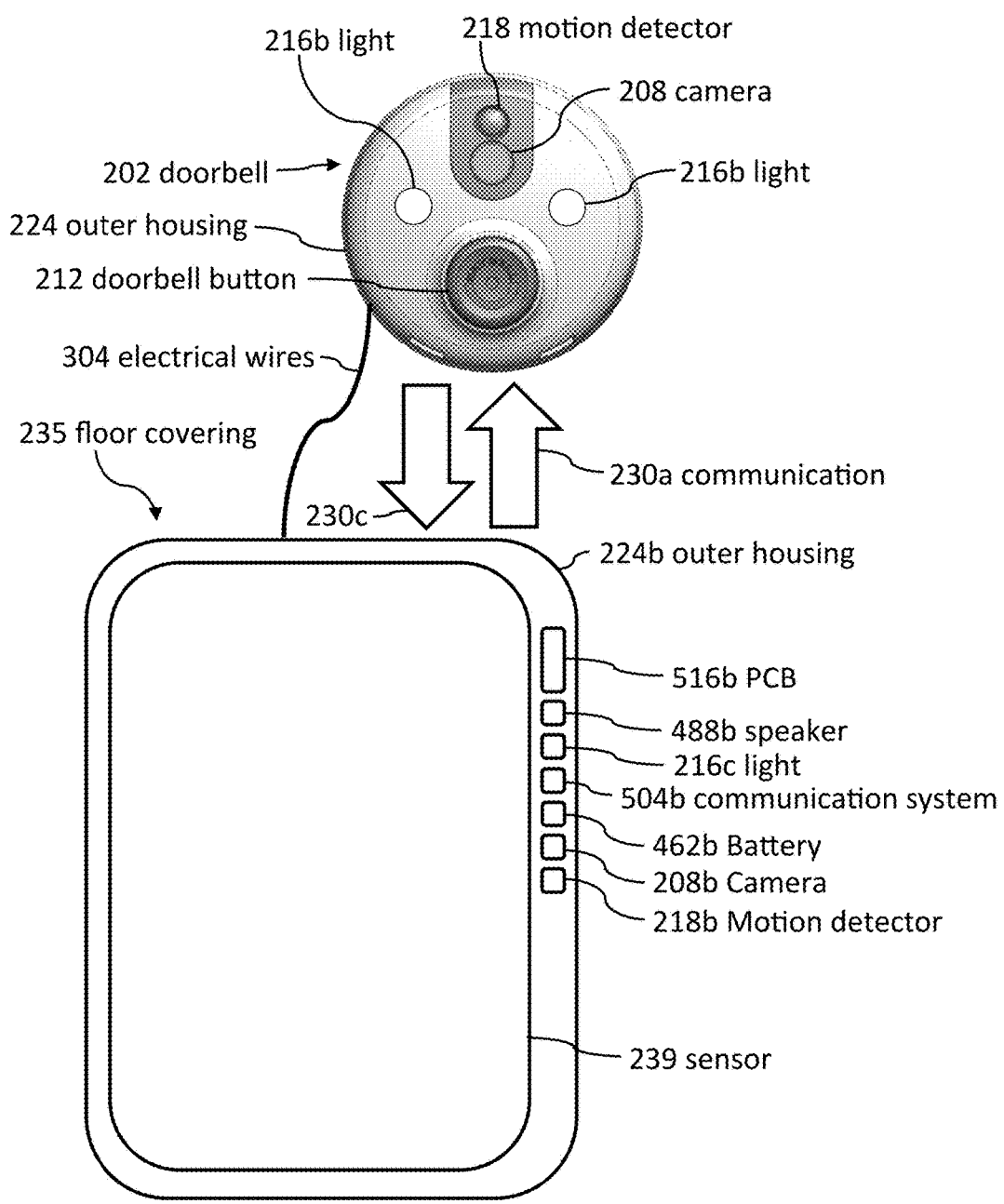

FIG. 6 illustrates a diagrammatic view of the floor covering 235. FIG. 6 illustrates a top view of the floor covering 235 and a front view of the doorbell 202. Electrical wires 304 electrically couple the doorbell 202 to the floor covering 235 to enable the doorbell 202 to provide electrical power to the floor covering 235 (or vice versa). The doorbell 202 can receive electrical power from the building 300 (shown in FIG. 5) and then can provide at least a portion of the electrical power to the floor covering 235 via the electrical wires 304 (e.g., while the doorbell 202 is mounted to a wall of the building 300 and while the floor covering 235 is located on the ground). The electrical wires 304 can also be used for one-way communication and/or two-way communication between the doorbell 202 and the floor covering 235.

Several embodiments do not include electrical wires 304 between the doorbell 202 and the floor covering. The doorbell 202 can send communications 230c to the floor covering 235 wirelessly. The floor covering 235 can send communications 230a to the doorbell 202 wirelessly.

The floor covering 235 can comprise a PCB, a speaker 488b, a light 216c, a battery 462b, a camera 208b, and a motion detector 218b. The floor covering 235 can also include a communication system 504b configured to enable communication between the floor covering 235 and the doorbell 202. The communication system 504b can include a transceiver. The communication system 504b can be a Bluetooth communication system, which can use Bluetooth Low Energy.

The sensor 239 can be configured to detect parcels on at least 60 percent of the top surface of the floor covering 235. This configuration can help minimize the occurrences of failing to detect a parcel that is located on the floor covering 235. The sensor 239 can be made of many individual pressure sensors, light sensors, package sensors, and/or any sensor configured to detect a parcel.

Although some embodiments are described in the context of devices and systems, the device embodiments and the system embodiments can also be formulated as methods. Some embodiments include methods of detecting parcels. Methods can include obtaining a delivery parcel detection system comprising a doorbell having a first wireless communication system; and a floor covering configured for placement on an entryway floor. The floor covering can comprise a sensor. Methods can include detecting, by the sensor of the floor covering, a first indication of a delivery parcel on the floor covering. Methods can include communicatively coupling the doorbell to the floor covering; mounting the doorbell to a building; and/or placing the floor covering in on an entryway floor.

Several embodiments include sending a first communication from the floor covering to the doorbell in response to the floor covering detecting the first indication of the delivery parcel. Some methods include sending a second communication from the doorbell to a remote computing device in response to the doorbell receiving the first communication.

The second communication can comprise a first picture taken by the doorbell. Some methods comprise sending, by the doorbell, the first picture to the remote computing device in response to the floor covering detecting the first indication of the delivery parcel.

Figure 7:
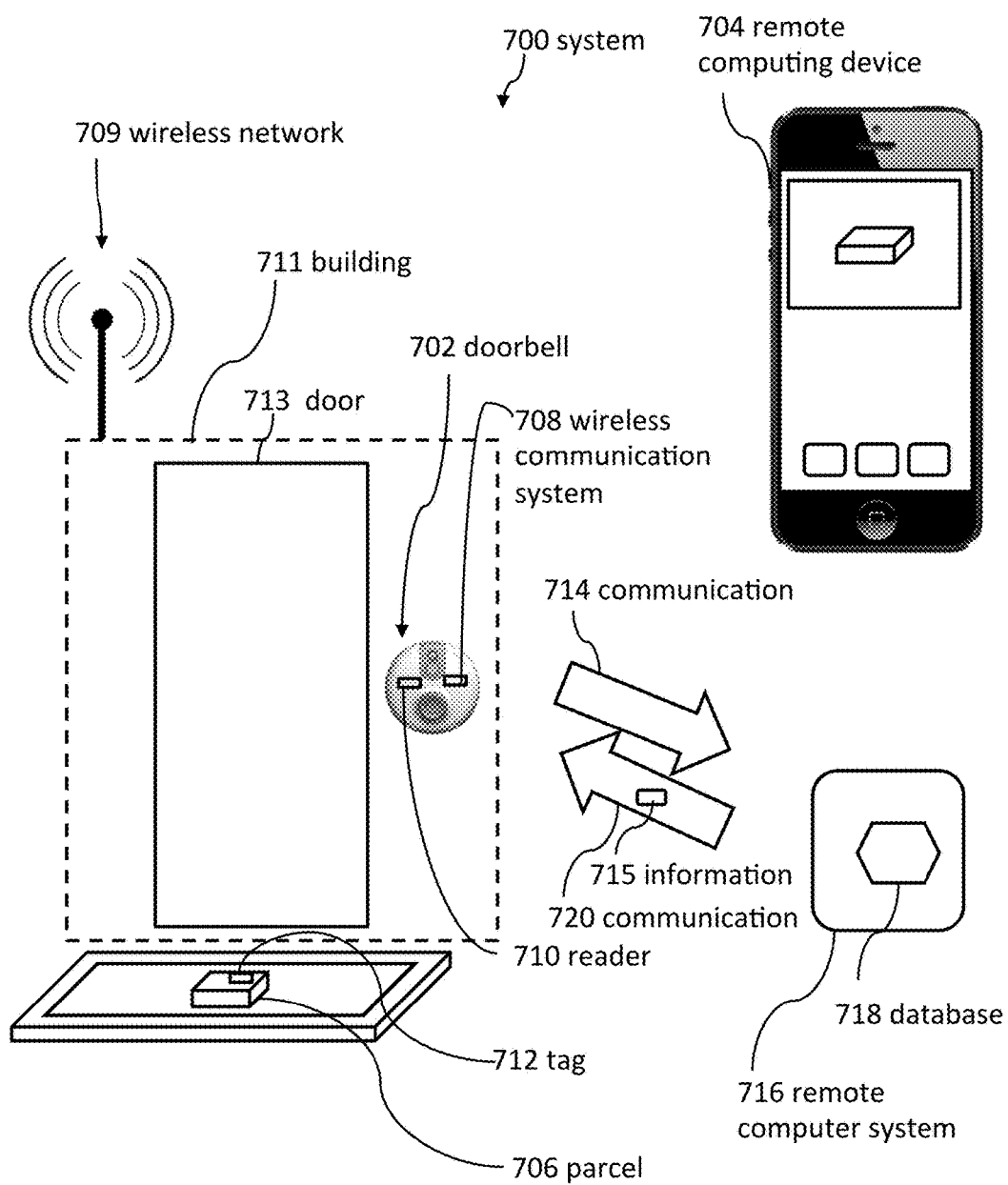
FIG. 7 illustrates a diagrammatic view of a doorbell system that can use a radio frequency identification reader to detect parcels, according to some embodiments.
Figure 8:
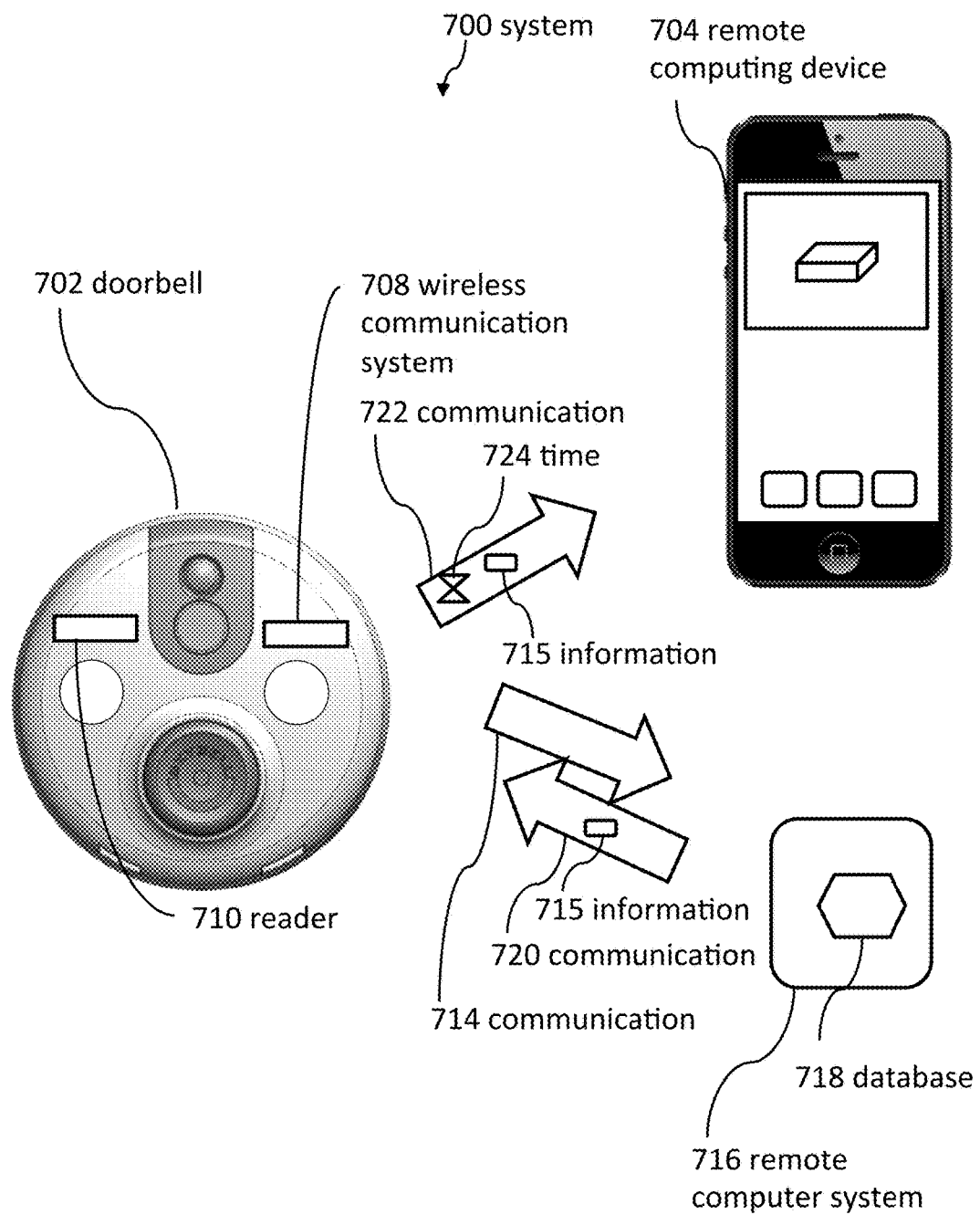
FIGS. 8 and 9 illustrate a diagrammatic view of a doorbell system that can use a radio frequency identification reader to detect parcels, according to some embodiments.

Referring now to FIGS. 7 and 8, in several embodiments, a delivery parcel detection system 700 includes a doorbell 702, a remote computing device 704, and a delivery parcel 706. The doorbell 702 may have a first wireless communication system 708 and a radio-frequency identification reader 710. The doorbell 702 can be attached to the outside wall of a building 711, for example near a door 713. The remote computing device 704 may be communicatively coupled with the doorbell 702 via the first wireless communication system 708. The first wireless communication system 708 may be configured to interface with or include a wireless network 709. The delivery parcel 706 may have a radio-frequency identification tag 712. When a parcel 706 with a radio frequency identification tag 712 is left near the door 713 by, for example, a mail carrier, the doorbell 702 can detect the parcel 706. The doorbell 702 detects the parcel 706 by the radio-frequency identification reader 710 reading the radio-frequency identification tag 712 of the delivery parcel 706.

When the doorbell 702 detects the radio-frequency identification tag 712, a first communication 714 can be sent from the doorbell 702 to a remote computer system 716. The remote computer system 716 may comprise a database 718. The remote computer system 716 may be affiliated with the sender. The database 718 may have information 715 regarding the delivery parcel 706. A second communication 720 may be sent from the remote computer system 716 to the doorbell 702 in response to the remote computer system 716 receiving the first communication 714. The second communication 720 may comprise the information 715 regarding the delivery parcel 706.

In some embodiments, the system 700 may further comprise a third communication 722 sent from the doorbell 702 to the remote computing device 704 in response to the doorbell 702 receiving the second communication 720. The third communication 722 can contain the information 715 that was received by the doorbell 702 from the sender. The third communication 722 may also contain a time 724 indicative of when the doorbell 702 first detected the delivery parcel 706.

For example, the user may order a product from the sender online. The sender ships the product and when it arrives on the doorstep (the delivery parcel 706), the doorbell 702 detects the parcel 706 and sends a communication 714 to the sender that the parcel 706 has arrived at its destination. The sender may then send information 715 associated with the delivery parcel 706 back to the doorbell 702. Once the doorbell 702 has this information 715 it may send it on, in another communication, to the user, thus allowing the user to be notified that they have a parcel 706 and information 715 about it. The communication may also notify them of the time of delivery of the parcel 706. The information 715 associated with the delivery parcel 706 may be a description of the contents of the parcel 706, the name of the sender of the parcel 706, the value of the parcel 706, etc. The remote computer system 716 may be, for example, a server, a website, a computer, or a workstation.

Figure 9:
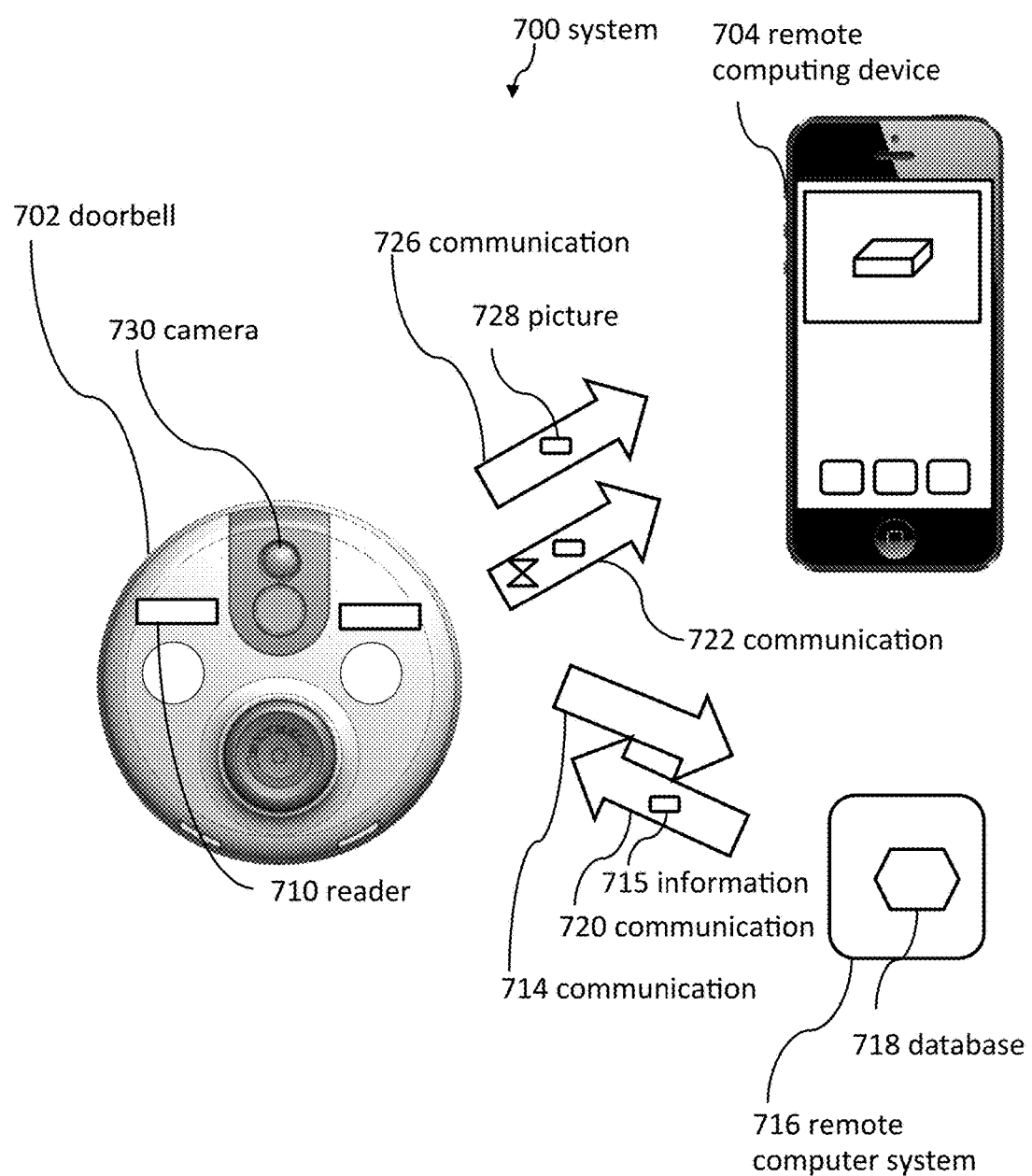

Referring now to FIG. 9, the doorbell 702 may also include a camera 730 to allow the user to see the parcel 706 that has been delivered. When the doorbell 702 detects a parcel 706, it may take a picture of the parcel 706 and send it to the remote computing device 704 in a fourth communication 726. A fourth communication 726 may also be sent from the doorbell 702 to the remote computing device 704 in response to the doorbell 702 receiving the second communication 720. The fourth communication 726 may comprise a first picture 728 taken by a camera 730. The first picture 728 may show the delivery parcel 706.

Figure 10:
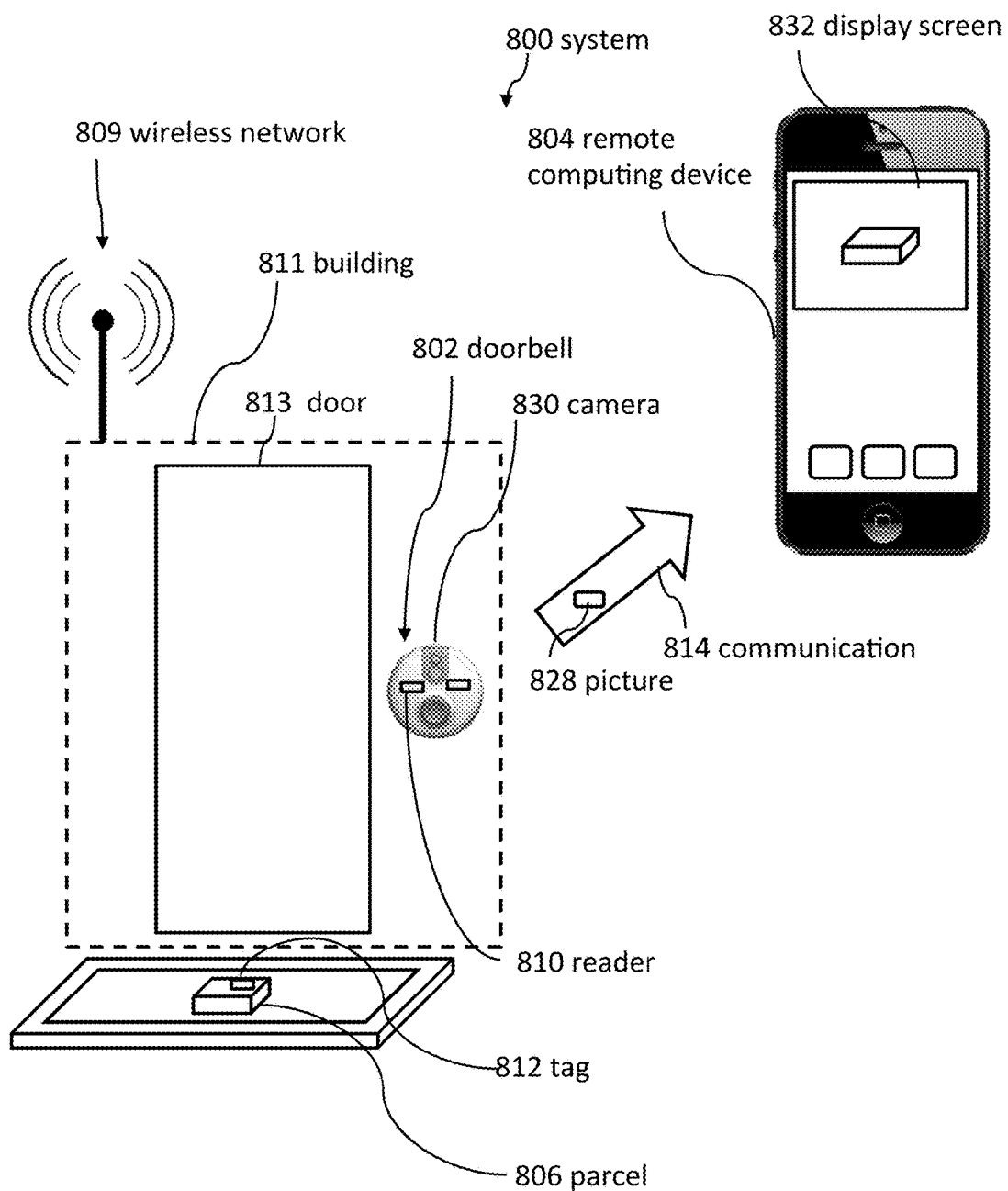
FIGS. 10, 11, and 12 illustrate a diagrammatic view of a doorbell system that can use a radio frequency identification reader to detect parcels within a detection range, according to some embodiments.

Referring now to FIG. 10, in several embodiments the system 800 may comprise a first notification 814 sent from the doorbell 802 to the remote computing device 804 in response to the doorbell 802 detecting the radio-frequency identification tag 812 of the delivery parcel 806. The first notification 814 may comprise a first picture 828 taken by a camera 830 of the doorbell 802 in response to the doorbell 802 detecting the radio-frequency identification tag 812 of the delivery parcel 806. The remote computing device 804 may have a display screen 832 to allow a user to, for example, view at least a portion of the first picture 828 displayed on the display screen 832. The system 800 may be configured to enable a user of the remote computing device 804 to see the delivery parcel 806 on the display screen 832 in response to the first notification 814.

Figure 11:
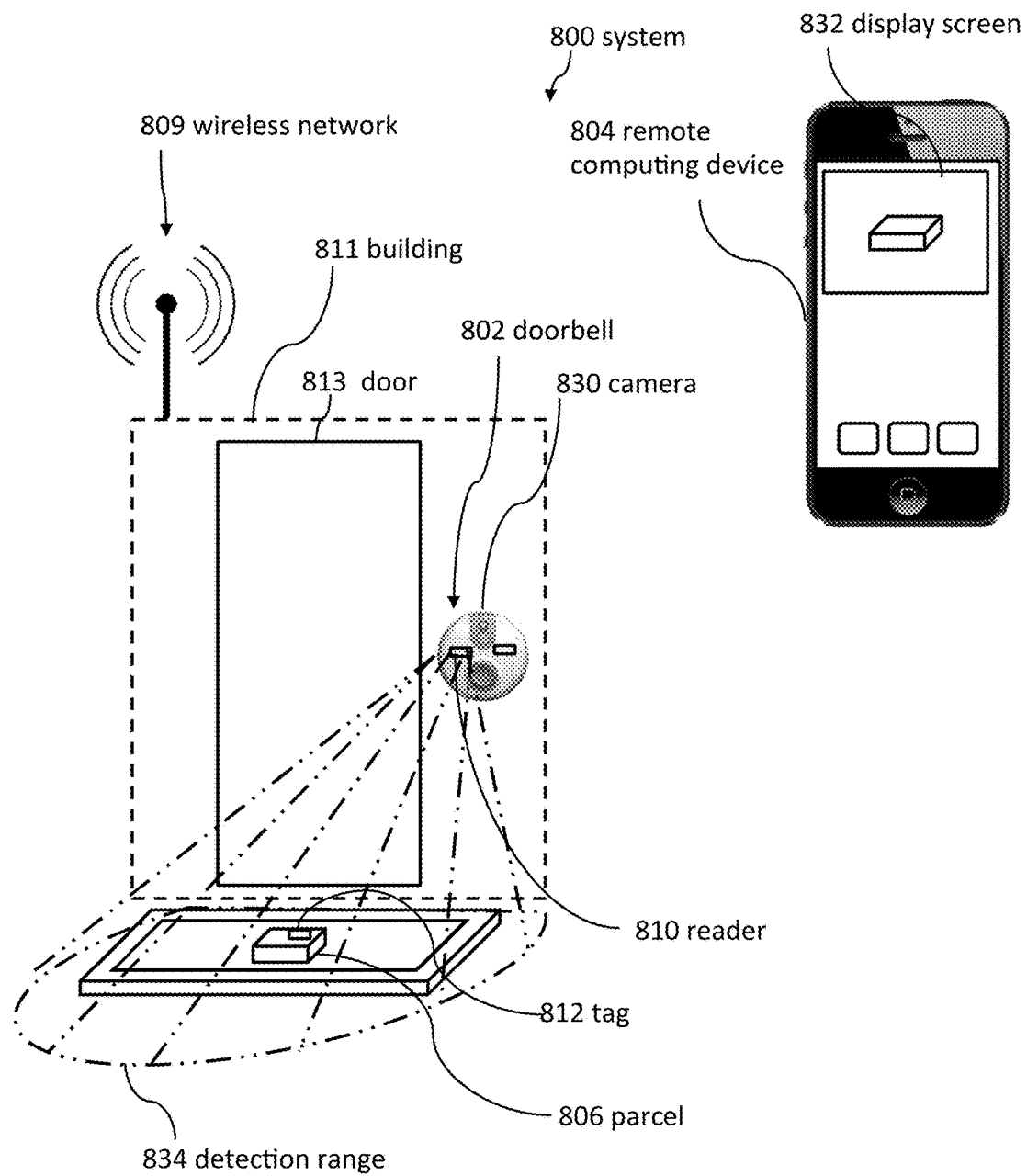
Figure 12:
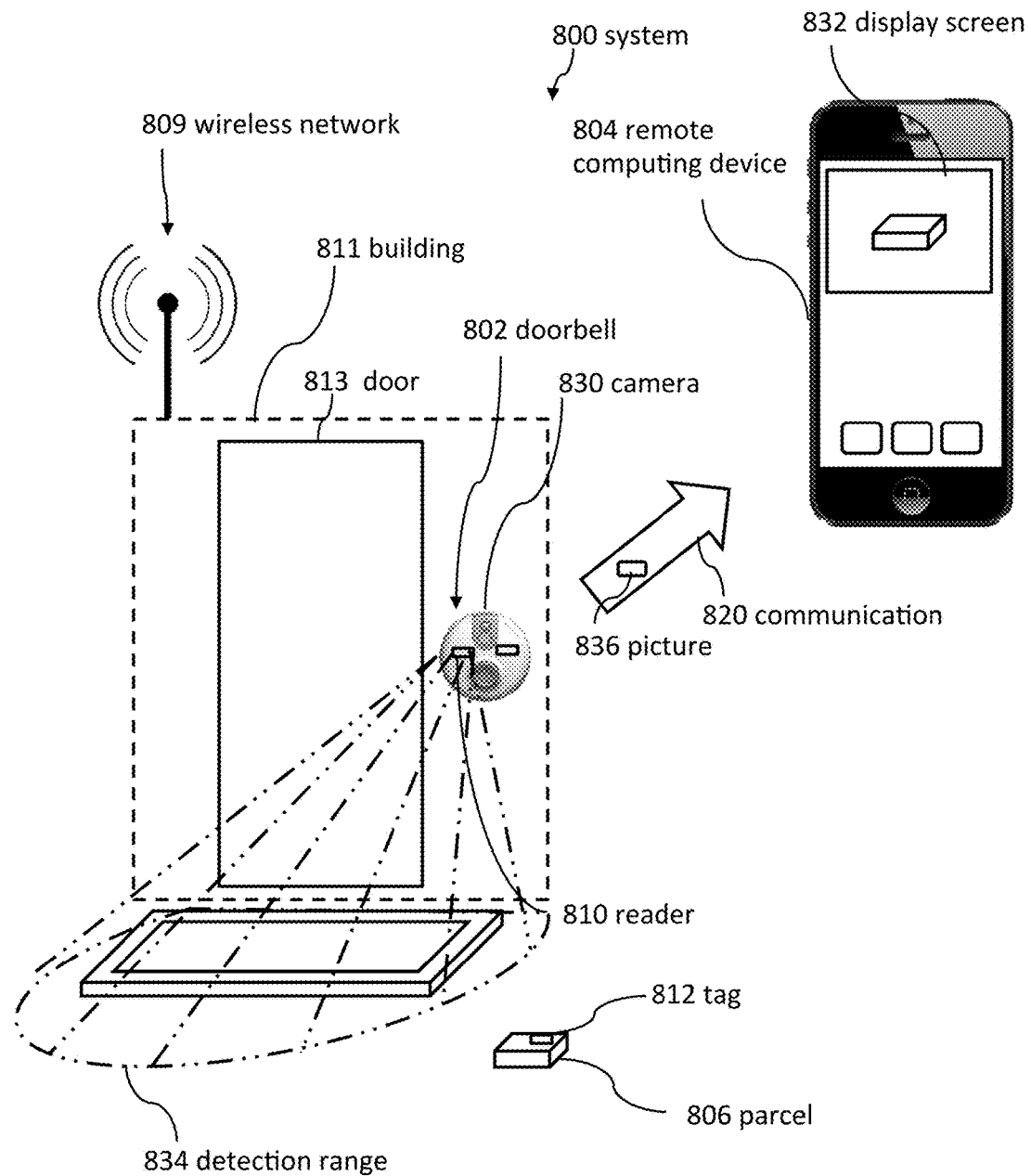

Referring now to FIGS. 11 and 12, the doorbell 802 may be attached to a building 811, for example, near a door 813. The doorbell has a radio-frequency identification reader 810, which has a specific detection range 834. When a package is brought into this detection range 834, the radio-frequency identification reader 810 is able to read the radio-frequency identification tag 812 on the parcel 806. The system 800 may send a notification 814 to the remote computing device when a parcel 806 with a radio-frequency identification tag 812 enters the detection range 834. Likewise, if a parcel 806 with a radio-frequency identification tag 812 is removed from the detection range 834 (i.e. is no longer detected by the doorbell 802), the doorbell 802 may send a notification 820 to the remote computing device 804. The removal of a parcel 806 may trigger the camera 830 to take a picture 836. The picture 836 may allow a user to determine if the parcel 806 was stolen, or blown away, etc. The notification 820 that the parcel 806 has been removed could also alert a user when a parcel 806 is picked up by, for example, a mail carrier. The notification 820 that the parcel 806 has been removed may contain the picture 836 taken by the camera 830 of the doorbell 802 as well as other information (i.e. the time, date, etc.).

Figure 13:
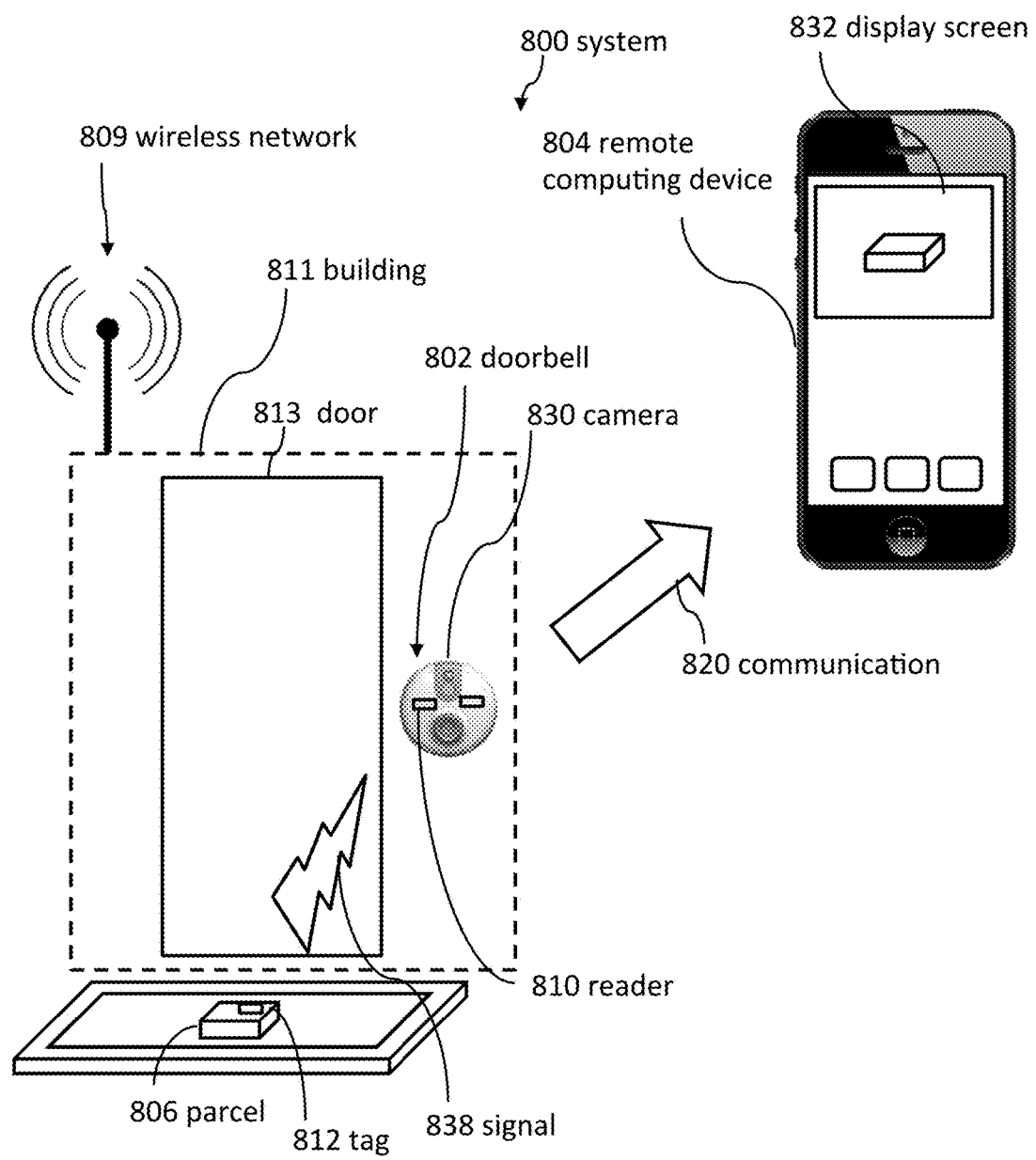
FIGS. 13 and 14 illustrate a diagrammatic view of a doorbell system that can use a radio frequency identification reader to detect parcels within a detection range, according to some embodiments.
Figure 14:
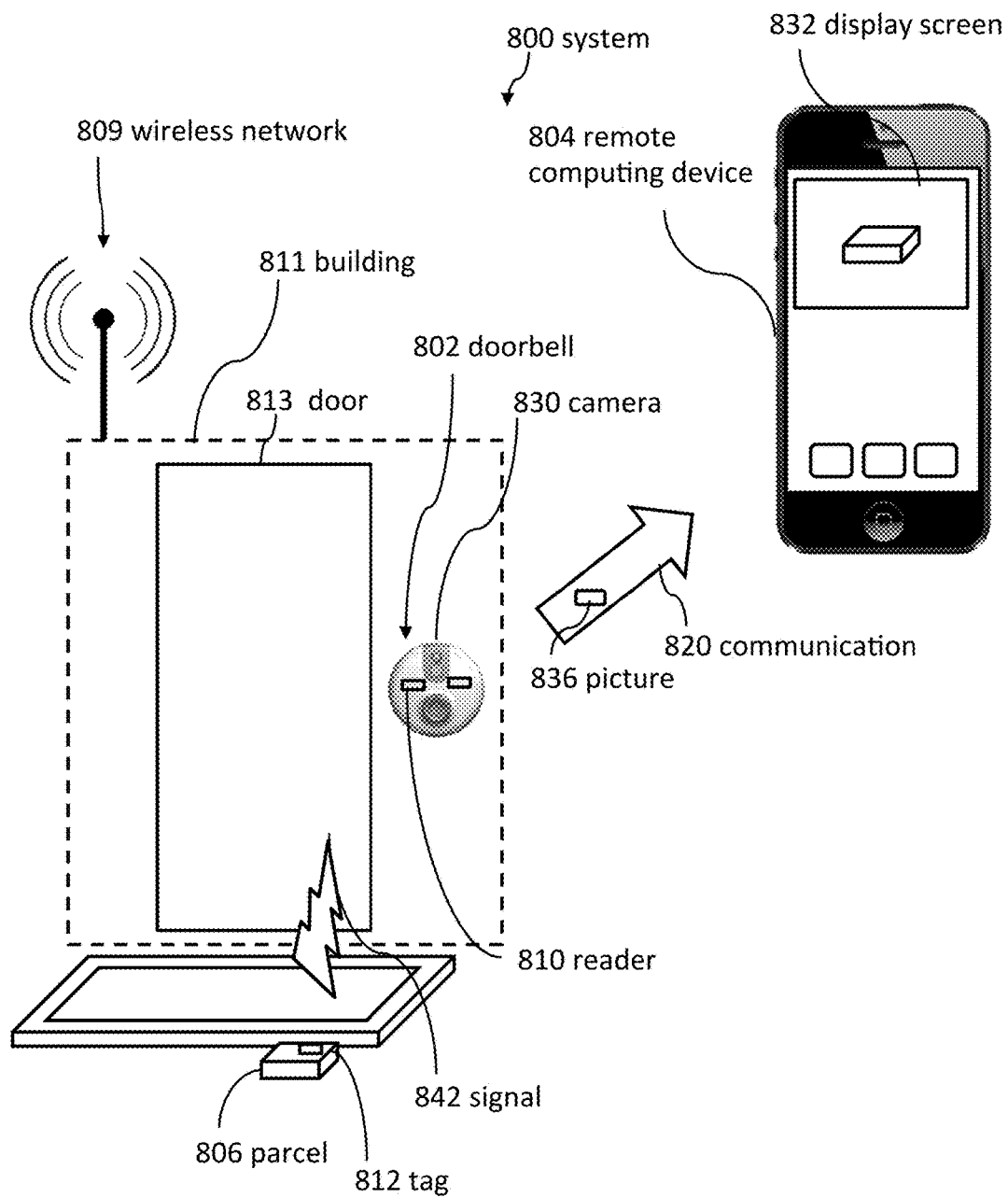

Referring now to FIGS. 13 and 14, the doorbell 802 may also detect when the parcel 806 is moving. It may detect the parcel moving by comparing strengths of two different signals 838, 842 from the radio-frequency identification tag 812 on the parcel 806. For example, the system 800 may further comprise a first signal 838 of the radio-frequency identification tag 812 detected by the doorbell 802 at a first time, a second signal 842 of the radio-frequency identification tag 812 detected by the doorbell 802 at a second time 844, and a second notification 820 sent from the doorbell 802 to the remote computing device 804. The system may determine that the parcel is moving farther from the doorbell 802 or is being removed if the second signal 842 is weaker than the first signal 838. In response to the doorbell 802 detecting the parcel moving farther from the doorbell or a removal of the delivery parcel 806 the doorbell 802 may send a second notification 820 to the remote computing device 804. The doorbell 802 may also take a picture 836 with the camera 830 in response to the doorbell 802 detecting the parcel 806 is moving or is removed. The second notification 820 may comprise the second picture 836 taken by a camera 830 of the doorbell 802. The radio-frequency identification tag 812 may be an active tag. The doorbell 802 may be configured to detect the delivery parcel 806 by the radio-frequency identification reader 810 reading the passive radio-frequency identification tag 812 of the delivery parcel 806. The doorbell 802 may be configured to detect the delivery parcel 806 by the radio-frequency identification reader 810 reading the active radio-frequency identification tag 812 of the delivery parcel 806.

Package theft is a growing problem. One way to combat package theft is to enable a delivery person to place packages inside the home. This approach, however, often depends on providing a key to the delivery person. Some embodiments provide physical keys, but many embodiments provide temporary digital keys that enable the delivery person to unlock a smart lock that secures the door.

Ensuring that only authorized delivery personnel can use digital keys is important. Embodiments provide diverse ways to help appropriate delivery personnel to gain access to homes while precluding, for example, a burglar from using a package to open a lock.

Figure 15:
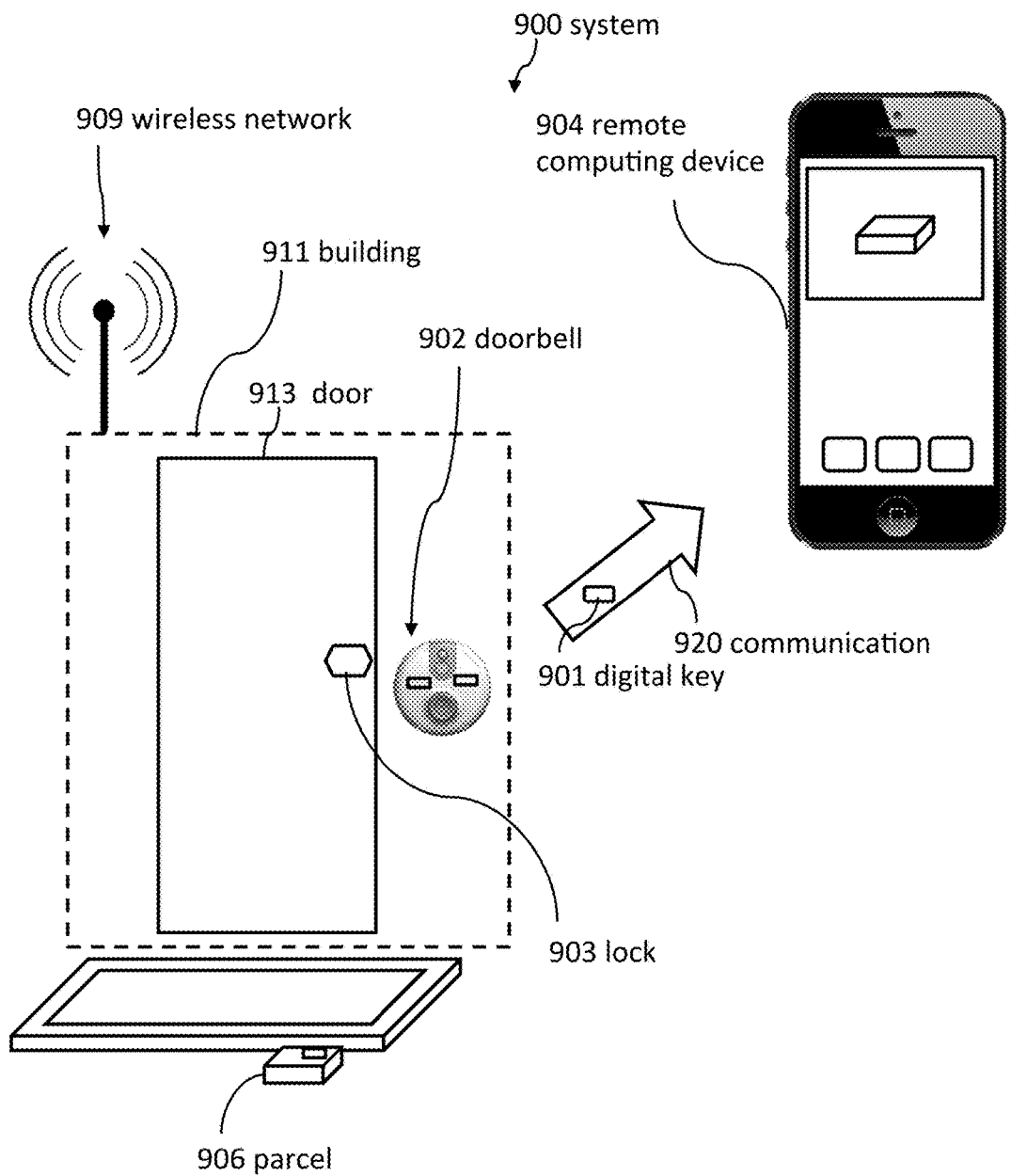
FIGS. 15, 16, and 17 illustrate a diagrammatic view of a doorbell and lock system, according to some embodiments.

FIG. 15 shows a delivery parcel detection system 900. A delivery person may receive a digital key 901 from a delivery parcel detection system 900, from a smart lock 903, and/or from a doorbell 902. The delivery person may receive the digital key 901 on, for example, the remote computing device 904 of the delivery person. The digital key 901 can be configured to enable unlocking a door 913 of a building 911 to which a delivery parcel 906 is addressed to permit the delivery person to place the delivery parcel 906 inside the building 911 in response to detecting the digital key 901. The building 911 may be one or more of the following: a house, an apartment, a hotel room, a business, an office, a shed, or a closet. The door 913 may include a lock system 903 configured to impede unauthorized entry into the building 911. The system may include a wireless network 909. At least one of a doorbell 902 and the lock system 903 may detect the digital key 901 via a first wireless communication 920 from the remote computing device 904 to at least one of the doorbell 902 and the lock system 903. Enabling the door 913 to be unlocked can include unlocking the door 913 in response to detection of the digital key 901, disengaging the locking mechanism to allow the door 913 to be opened, allowing a lock 903 to be turned by a delivery person prior to opening the door 913, and/or enabling a code or a password to be used to unlock the door 913. The door 913 can be any door of a building. In some embodiments, the door 913 is a front door with side hinges. In several embodiments, the door 913 is a garage door configured to be opened vertically by a garage door opener. In some embodiments, the door 913 is a gate.

Further security measures may be used or designed to, for example, ensure security of the building 911. Some of these security measures may incorporate one or more of the following: timed delivery windows, package identification, delivery vehicle tracking, proximity detectors, delivery person identification, video surveillance, and/or any combination thereof.

The digital key 901 can be sent to a remote computing device 904 such as a smartphone or the package scanning device often used by delivery personnel. The remote computing device 904 can be communicatively coupled to the doorbell 902 and/or lock 903 of the building 911 via a direct wireless communication and/or via indirect wireless communication (e.g., through a cellular network or the cloud).

Figure 16:
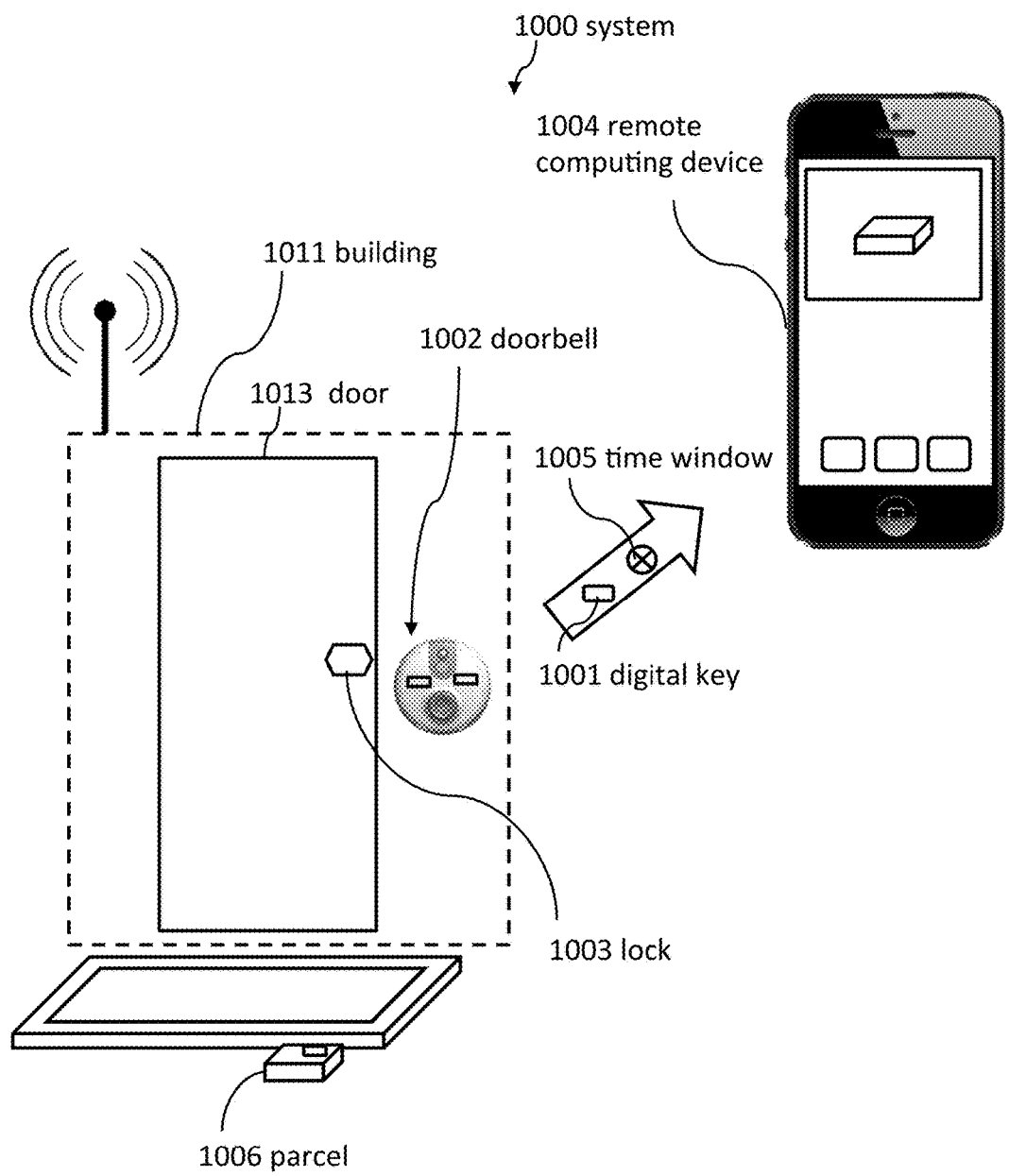

Referring now to FIG. 16, it may not be desirable for a delivery person to have a digital key 1001 that can allow them access to a house or building 1011 at any time. One way to increase security and better control access to the building 1011 or room can include the delivery parcel 1006 having an expected delivery time window 1005. Many delivery services already provide an expected delivery time or expected delivery time window 1005, i.e., between 10:00 am to 2:00 pm on Wednesday, for when the parcel 1006 will be delivered. There are several ways to control access to the house or building 1011 using the expected delivery time window 1005. For example, the digital key 1001 can be sent to the remote computing device 1004 only once this time window 1005 has arrived, e.g., at 10:00 am on Wednesday in the example above. The digital key 1001 can be configured to enable unlocking the door 1013 during a delivery window 1005. For example, if a delivery parcel 1006 (such as a package or envelope) is scheduled to arrive from 10:00 am to 2:00 pm on Wednesday, the digital key 1001 will only enable unlocking the lock 1003 from 10:00 am to 2:00 pm on Wednesday. The digital key 1001 may also be sent within a predetermined period prior to the expected delivery time window, e.g., the digital key 1001 is sent one hour prior to the expected delivery time window 1005, and then the system 1000 may only enable the digital key 1001 once the expected delivery window 1005 has arrived. Since, packages do not always arrive precisely within their expected delivery window 1005, in some embodiments, the digital key 1001 will also permit unlocking the lock 1003 for a certain amount of time before and after the delivery window. (i.e., ten minutes before the expected delivery window 1005). Enabling the digital key 1001 can include the system recognizing the digital key 1001 or configuring the lock 1003 and/or doorbell 1002 to unlock the door 1013 in response to detecting the digital key 1001. The digital key 1001 may also be disabled in response to a second time being past the expected delivery time window 1005 or a second time being outside of a certain amount of time after the expected delivery window 1005. Disabling the digital key 1001 can include the system 1000 no longer recognizing the digital key 1001 or configuring the lock 1003 and/or doorbell 1002 to not unlock the door 1013 in response to detecting the digital key 1001. By enabling the digital key 1001 only during an expected time window 1005, or for a certain time around an expected time window 1005, and/or disabling it after the expected time window 1005, or a certain time around an expected time window 1005, users can better control access to the building 1011 or home.

Figure 17:
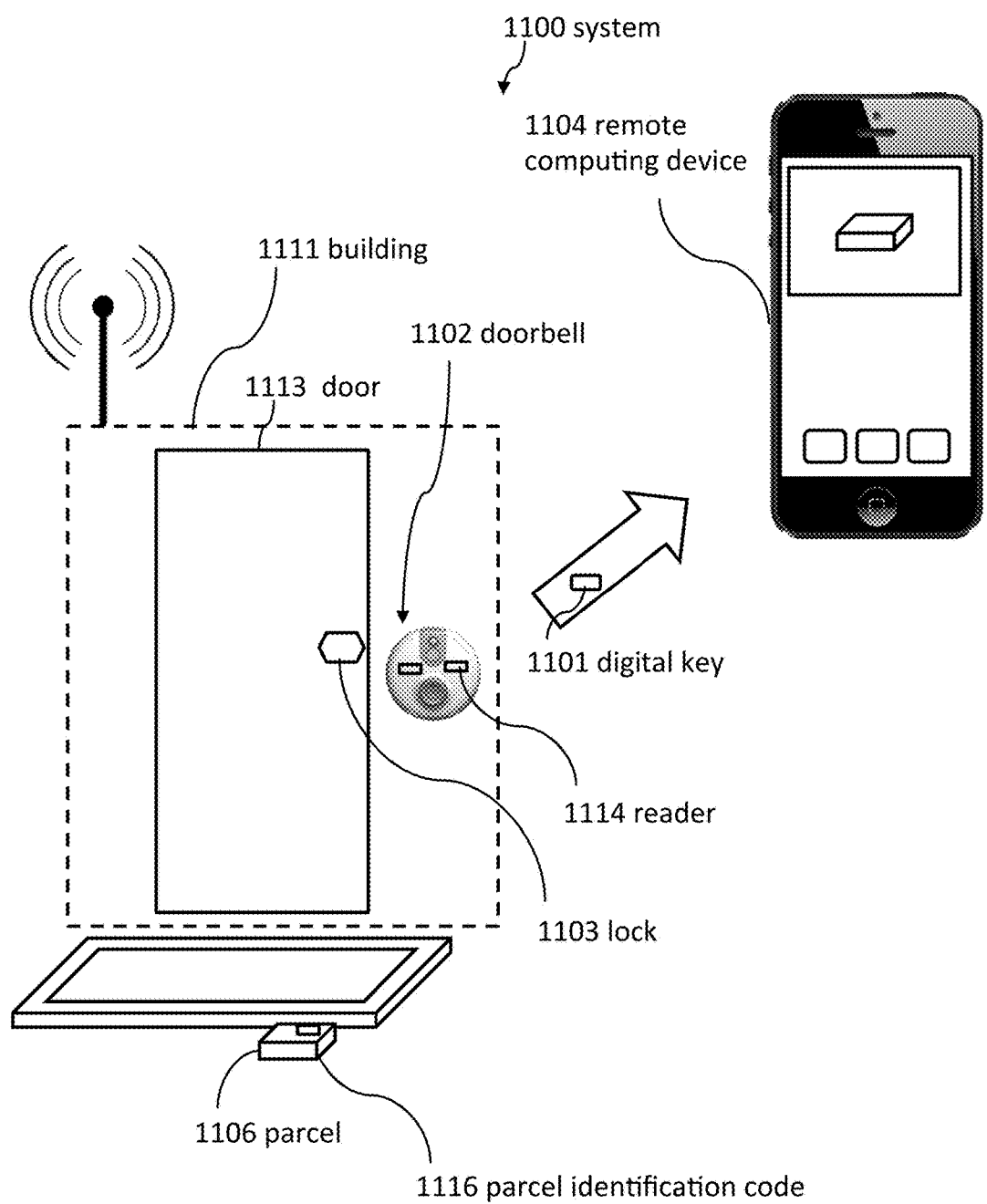
Figure 18A:
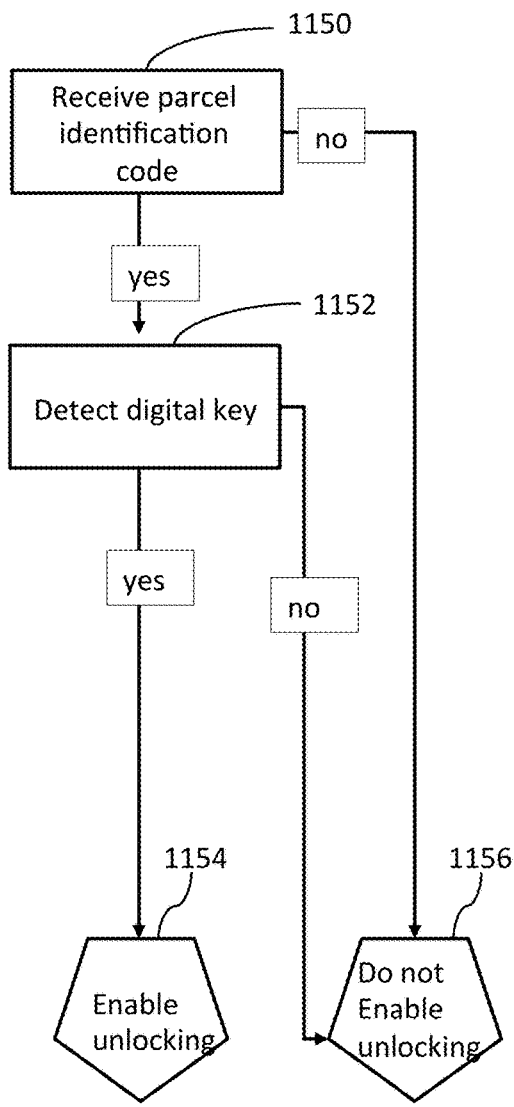
FIGS. 18a and 18b are schematics of a method of enabling the unlocking of a door, according to some embodiments.
Figure 18B:
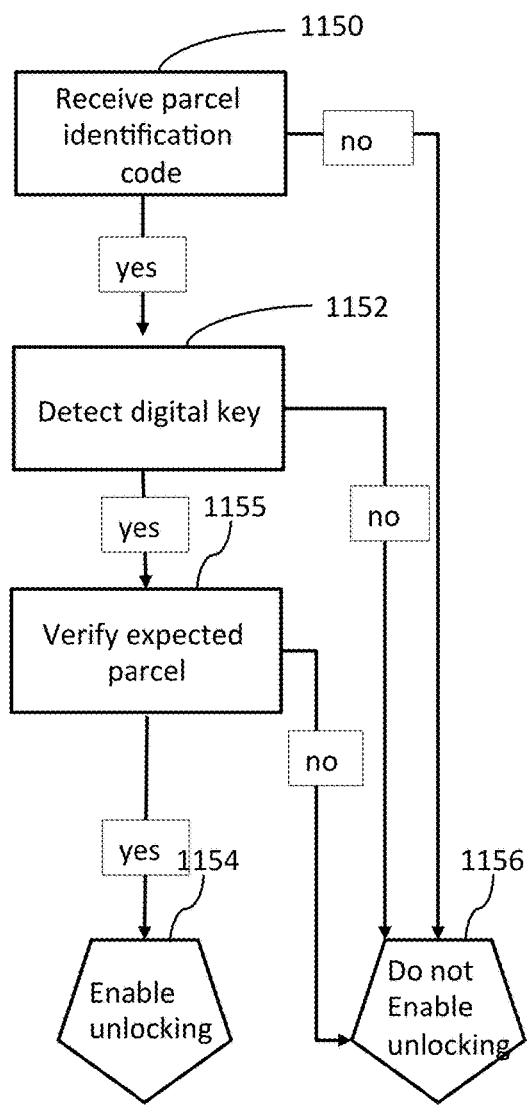

Referring now to FIGS. 17, 18a, and 18b, another way to increase security would be to "tie" the digital key 1101 to the parcel 1106. The digital key can be "tied" to the parcel delivery such that the digital key is not functional unless used in conjunction with the parcel delivery. Tying the parcel 1106 to the digital key 1101 would only allow the digital key 1101 to function when used in conjunction with the parcel delivery. This may be used as another line of security. A person who has the digital key 1101 but not the parcel 1106 cannot gain access to the building 1111 and likewise, someone who has the parcel 1106 but not the digital key 1101 cannot gain access.

One way to tie the parcel 1106 to the digital key 1101 is with the use of a parcel identification code 1116. The doorbell 1102 and/or the lock system 1103 can receive 1150 a delivery parcel identification code 1116 of the delivery parcel 1106. The doorbell 1102 or lock system 1103 may receive 1150 the delivery parcel identification code of the delivery parcel 1106 by detecting it (i.e., when the delivery parcel 1106 or remote computing device 1104 is within direct wireless communication with the lock system 1103 or doorbell 1102), it may be received when the delivery person manually enters or scans a code, or in some other way. The delivery parcel identification code 1116 may be a radio-frequency identification ("RFID") tag, a barcode, or another type of identification code. The delivery parcel identification code 1116 can be scanned by the delivery person, using his remote computing device 1104 or another scanner, or may be scanned by the lock 1103 and/or doorbell 1102 either wirelessly or via a reader 1114. The doorbell 1102 and/or the lock system 1103 can also detect 1152 a digital key 1101. In response to both detecting 1152 the digital key 1101 and receiving 1150 the delivery parcel identification code 1116 the system can enable unlocking 1154 of the door 1113. The system does not enable unlocking 1156 of the door 1113 if it does not detect 1152 the digital key 1101 or does not receive 1150 the parcel identification code 1116. In order to ensure that the delivery parcel identification code 1116 is associated with a parcel 1106 which is expected by the user, the system 1100 can verify 1155 any number of features of the parcel 1106 prior to enabling 1154 the lock 1003 to be disengaged, as shown in FIG. 18b. For example, the system 1100 can verify that the delivery parcel identification code 1116 corresponds to an expected delivery time window. The system 1100 can verify that the delivery parcel identification code 1116 corresponds to an expected delivery item, i.e., something the user has ordered and is expected to be delivered. If the parcel 1106 does not correspond to an expected parcel 1106, the system does not enable 1156 unlocking of the door 1113.

Figure 19:
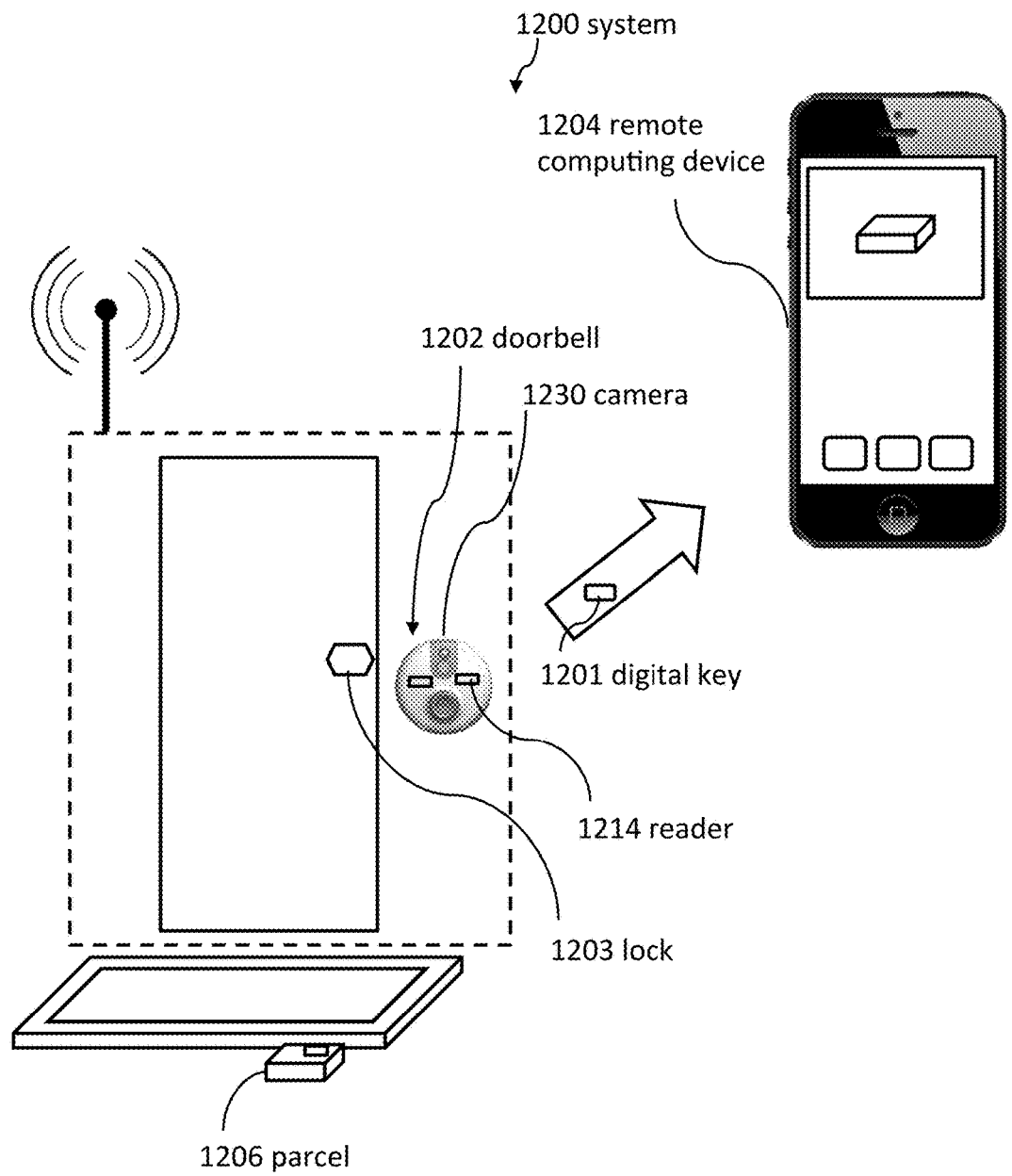
FIG. 19 illustrates a diagrammatic view of a doorbell and lock system, according to some embodiments.
Figure 20:
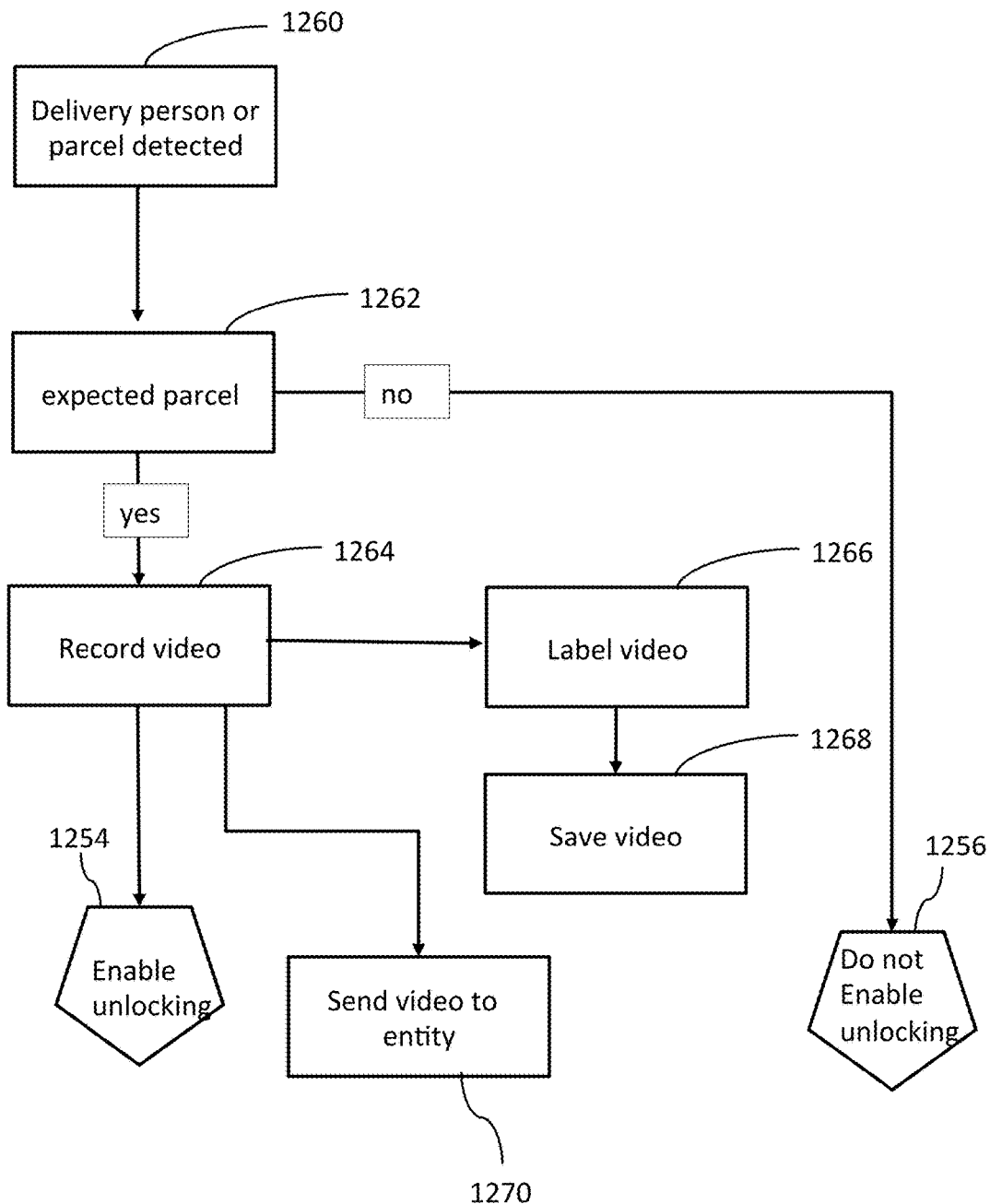
FIG. 20 is a schematic of a method of recording, labeling, and sending a video, according to some embodiments.

Referring now to FIGS. 19 and 20, the doorbell 1202 can include a camera 1230. The camera 1230 could allow the doorbell 1202 to be configured to automatically record video upon detection of a delivery person (e.g., a UPS, FedEx, or USPS delivery person). The system 1200 can be configured to know that the package delivery is authorized, can record a video of the delivery and/or of the parcel 1206, and/or can save the video as a delivery recording.

Retailers and delivery services may want to know that a parcel 1206 has been correctly delivered. The video can be sent to an entity associated with the delivery (e.g., to show Amazon that their parcel 1206 was delivered to the delivery address). This video can be used to resolve disputes regarding whether the parcel 1206 was actually delivered to preclude customers from receiving a parcel 1206, claiming they did not receive the parcel 1206, and then receiving a refund.

The system 1200 can include the ability to use visual analysis to detect the shape (i.e rectangle, square, circle, etc) of a parcel 1206 and notify the user that her parcel 1206 has arrived. Shape recognition may be used to verify the parcel 1206 is an expected delivery item prior to sending the digital key 1201 or prior to enabling the lock 1203 to be disengaged. The notification can specify whether the parcel 1206 is outside on the ground or is in their possession (e.g., inside the home).

The doorbell 1202 records a video 1264 in response to detecting 1260 the delivery person and/or in response to determining 1262 that the delivery parcel 1206 is an expected delivery item. The system may enable the unlocking 1254 of the door in response to determining the parcel 1206 is an expected parcel and does not enable the unlocking 1256 of the door in response to determining the parcel 1206 is not an expected delivery parcel. A parcel 1206 may be an envelope, a box, a padded envelope, a bag, and/or container. Several methods may be used to determine that the delivery parcel 1206 is an expected delivery item including RFID tag scanning, bar code scanning by the camera 1230, reader 1214, or remote computing device 1204, shape recognition, label identification, etc. The video can then be saved 1268 to a phone, computer, the cloud, other online storage, or within the doorbell system itself and labeled 1266 as a delivery. A doorbell 1202 can record many videos during the day, labeling 1266 the video indicates to a doorbell user that the video shows the delivery of at least one item. A user may have many videos on their phone, computer, or the cloud, and a label may be useful in identifying a video that contains data relating to a parcel 1206 thus allowing the user to more easily find the appropriate video.

When a video is recorded 1264 by the doorbell, several methods may be used to determine that the video shows a delivery. Once it is determined the video shows a delivery, then the video may be labeled to indicate that the video shows a delivery. The labeling can indicate to a doorbell user that the video shows the delivery of at least one item. Videos may then be sent to an entity 1270 associated with sending the delivery parcel. For example, if the delivery parcel is from Amazon, the entity can be Amazon, a third party that organizes the sending the delivery parcel, or the delivery service provider such as UPS, FedEx, or USPS, or any combination of those.

Figure 21A:
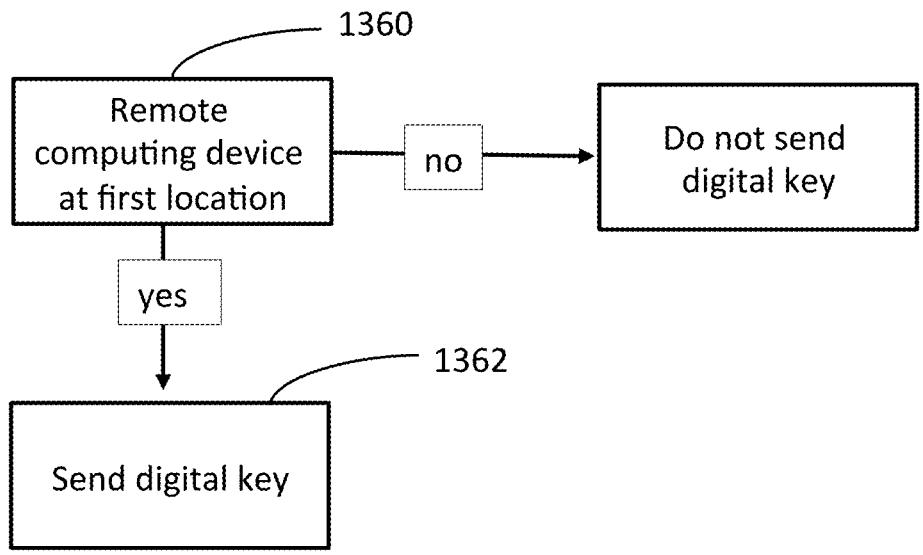
FIGS. 21a and 21b are schematics of methods of activating and deactivating a digital key, according to some embodiments.
Figure 21B:
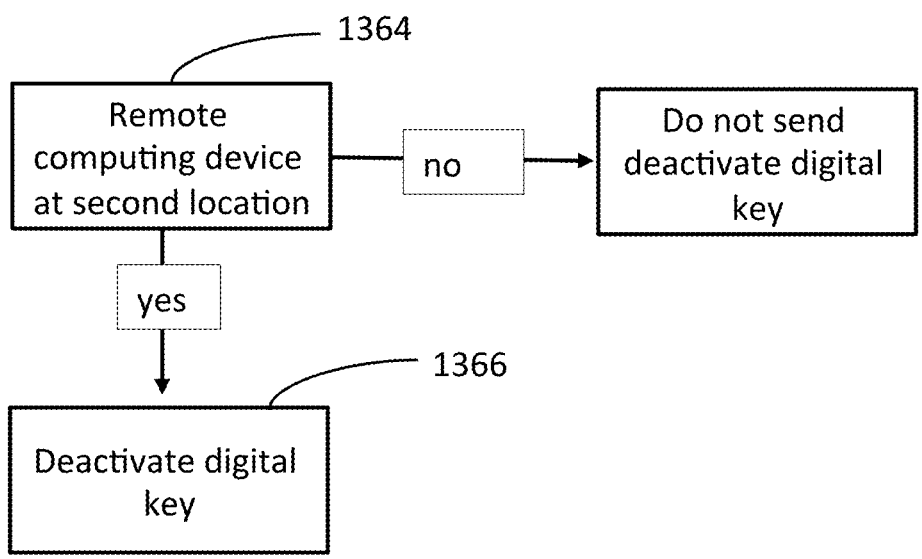
Figure 22:
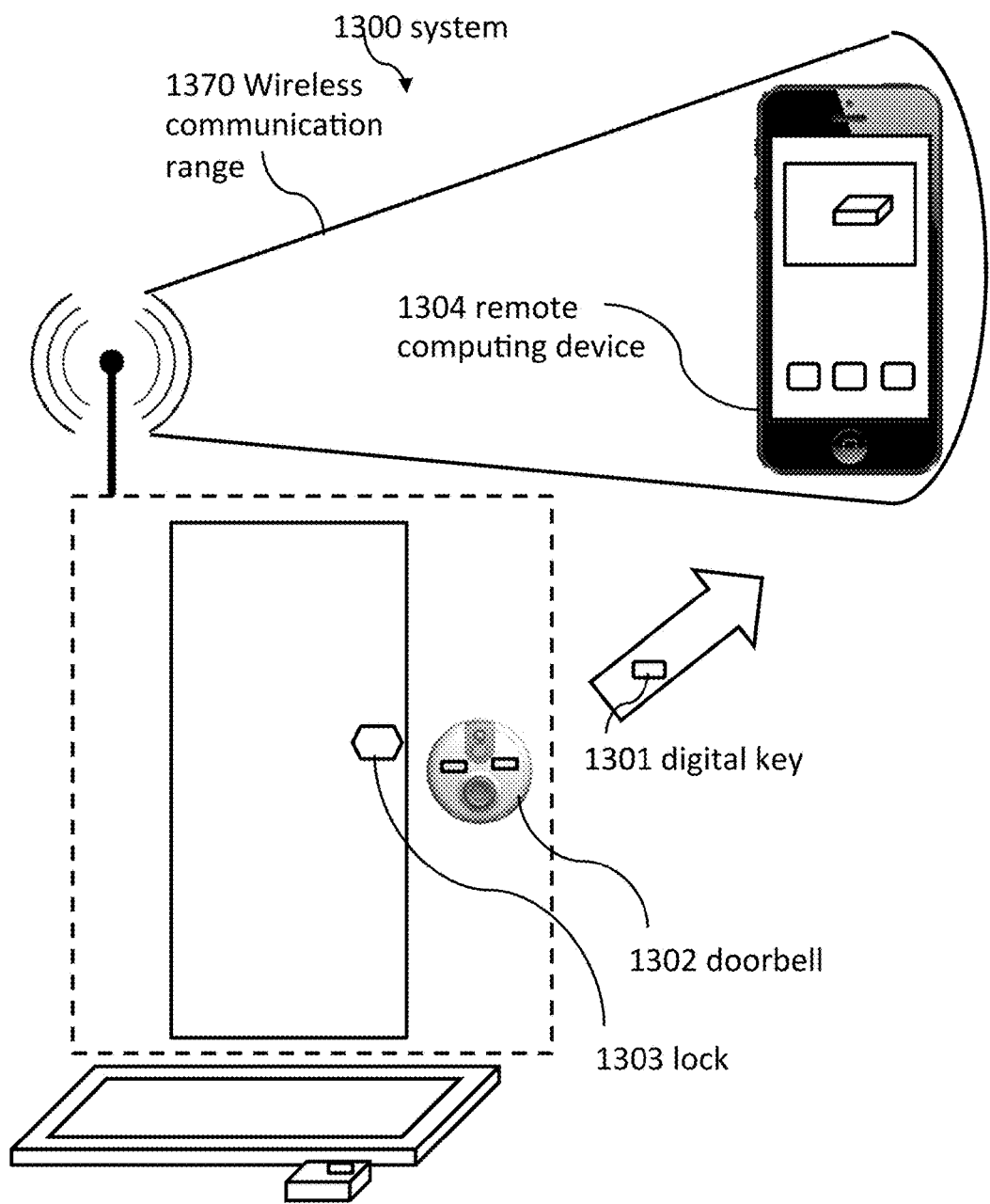
FIG. 22 illustrates a diagrammatic view of a doorbell and lock system, according to some embodiments.

Referring now to FIGS. 21a, 21b, and 22, a digital key 1301 can be a code that the delivery person enters or it can be transmitted from the remote computing device 1304 to the lock 1303 or doorbell 1302 without the delivery person ever seeing the actual "key". In order to limit the time that the digital key 1301 is active and therefore the time that the delivery person has access to a house or other building, the digital key 1301 may be sent to the delivery person or the remote computing device 1304 only when they are within a certain distance of the building or when they are at a certain location. The system 1300 detects 1360 when the remote computing device 1304 is at a first location and in response to detecting 1360 that the remote computing device 1304 is at this location, sends 1362 the digital key 1301 to the remote computing device 1304. The first location can be the delivery warehouse, the scheduled stop before the delivery of the user's package, the house or building of the user, or a specific distance away from the house or building of the user (i.e., within one mile of the lock system or the doorbell or within one mile of the lock system or doorbell, etc.). Several methods may be used to determine the location of the remote computing device 1304, including GPS tracking, or tracking over a cellular network. The digital key 1301 may also be delivered to the remote computing device 1304 in response to the remote computing device 1304 being within a direct wireless communication range 1370 of the doorbell 1302 or lock system 1303. Direct wireless communication range 1370 may be the range of WiFi associated with the doorbell 1302 and/or lock 1303, the range of Bluetooth associated with the lock 1303 and/or doorbell 1302, the range of an RFID reader associated with the lock 1303 and/or doorbell 1302, or the range of another wireless communication system associated with the lock 1303 and/or doorbell 1302. Likewise, the digital key 1301 may be sent to the remote computing device 1304 at any time prior to delivery and then only activated once the remote computing device 1304 has been detected at the first location. It may also be desirable to deactivate 1366 the digital key 1301 when the remote computing device 1304 is detected 1364 at a second location. For example, the digital key 1301 may be deactivated 1366 when the remote computing device 1304 is detected at the next scheduled delivery stop, when the remote computing device 1304 is detected to be outside of a certain distance of the house or building, or when the remote computing device 1304 is no longer in a direct wireless communication range 1370 of the doorbell 1302 and/or lock 1303.

Figure 23:
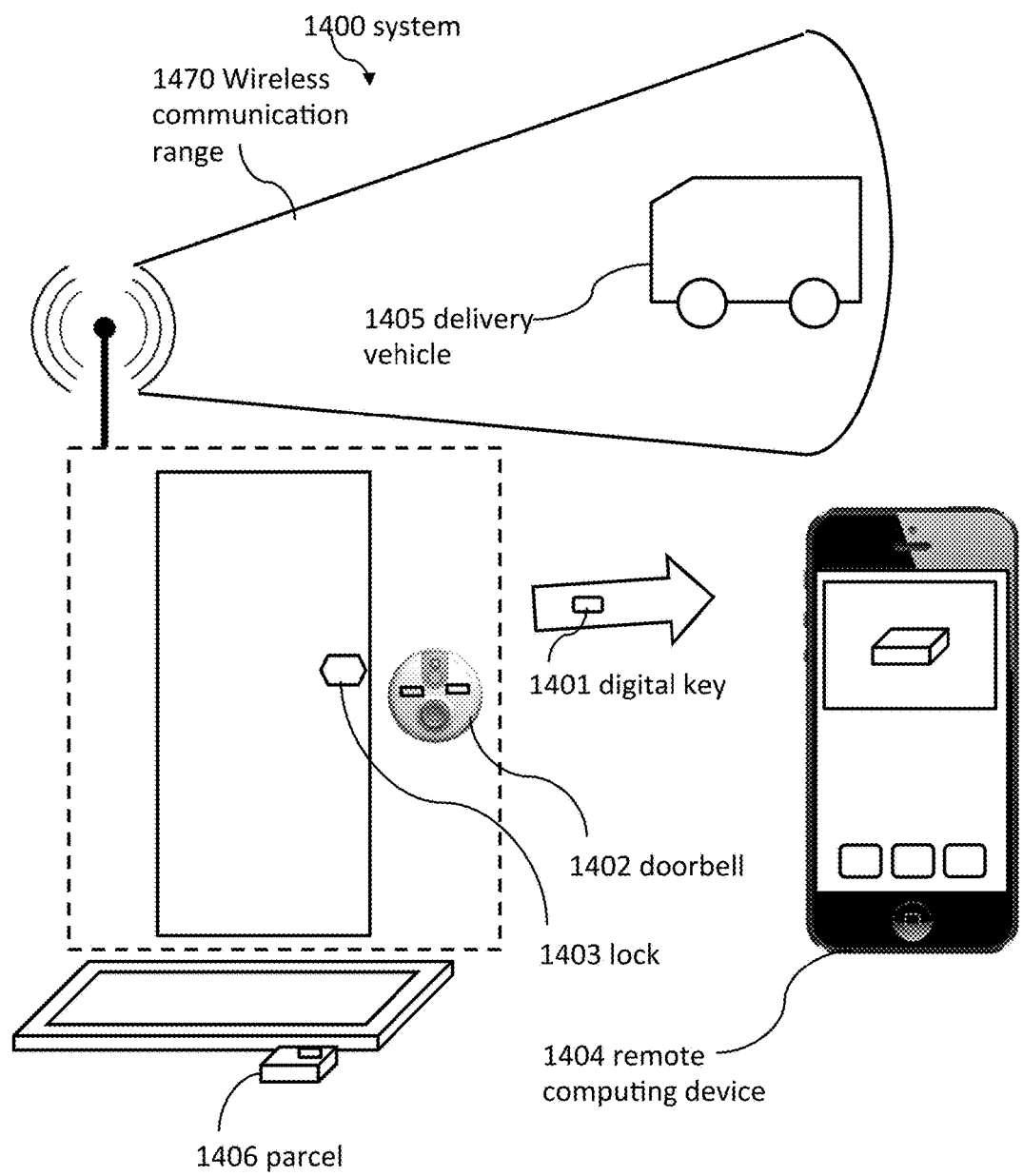
FIG. 23 illustrates a diagrammatic view of a doorbell and lock system and a delivery vehicle, according to some embodiments.
Figure 24A:
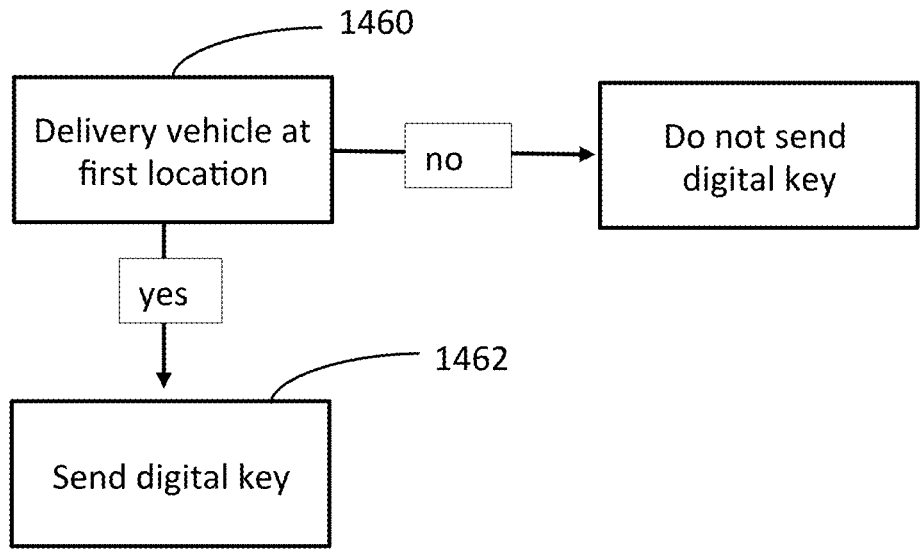
FIGS. 24a and 24b are schematics of methods of sending and deactivating a digital key, according to some embodiments.
Figure 24B:
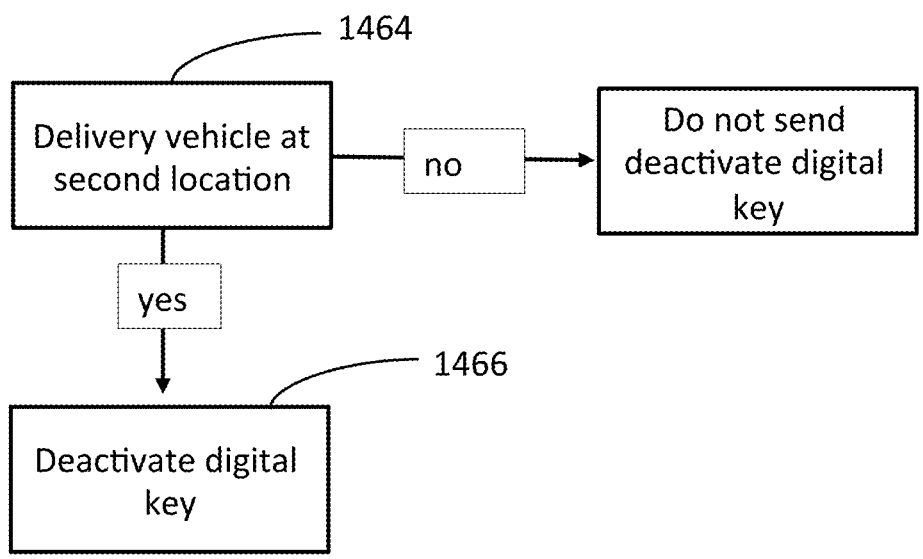

Some types of remote computing devices are small and can be stolen or given to another person. Referring now to FIGS. 23, 24a, and 24b, tracking the location of the delivery vehicle 1405 may be a more secure way to ensure that only the person delivering the parcel 1406 has access to the house or building. The digital key 1401 may be sent 1462 to the remote computing device 1404 in response to the lock system 1403 or doorbell 1402 detecting a first location 1460 of a delivery vehicle 1405. The system 1400 detects 1460 when the delivery vehicle 1405 is at a first location and in response to detecting 1460 that the delivery vehicle 1405 is at this location, sends 1462 the digital key 1401 to the remote computing device 1404. The first location can be the delivery warehouse, the scheduled stop before the delivery of the user's package, the house or building of the user, or a specific distance away from the house or building of the user (i.e., within one mile of the lock system or the doorbell or within one mile of the lock system or doorbell, etc.). The location of a delivery vehicle 1405 can be detected using a GPS attached to the delivery vehicle 1405 or another locator connected to the delivery vehicle 1405. The delivery vehicle can be configured to transport the remote computing device 1404 and the delivery parcel 1406. Methods may include sending the digital key 1401 to the remote computing device 1404 in response to the first location being within a direct wireless communication range 1470 of at least one of the doorbell 1402 and the lock system 1403. Direct wireless communication range 1470 may be the range of WiFi associated with the doorbell 1402 and/or lock 1403, the range of Bluetooth associated with the lock 1403 and/or doorbell 1402, the range of an RFID reader associated with the lock 1403 and/or doorbell 1402, or the range of another wireless communication system associated with the lock 1403 and/or doorbell 1402. Likewise, the digital key 1401 may be sent to the remote computing device 1404 at any time prior to delivery and then only activated once the delivery vehicle 1405 has been detected at the first location. It may also be desirable to deactivate 1466 the digital key 1401 when the delivery vehicle 1405 is detected at a second location 1464. For example, the digital key 1401 may be deactivated 1466 when the delivery vehicle 1405 is detected at the next scheduled delivery stop, when the delivery vehicle 1405 is detected to be outside of a certain distance of the house or building, or when the delivery vehicle 1405 is no longer in a direct wireless communication range 1470 of the doorbell 1402 and/or lock system 1403.

Figure 25:
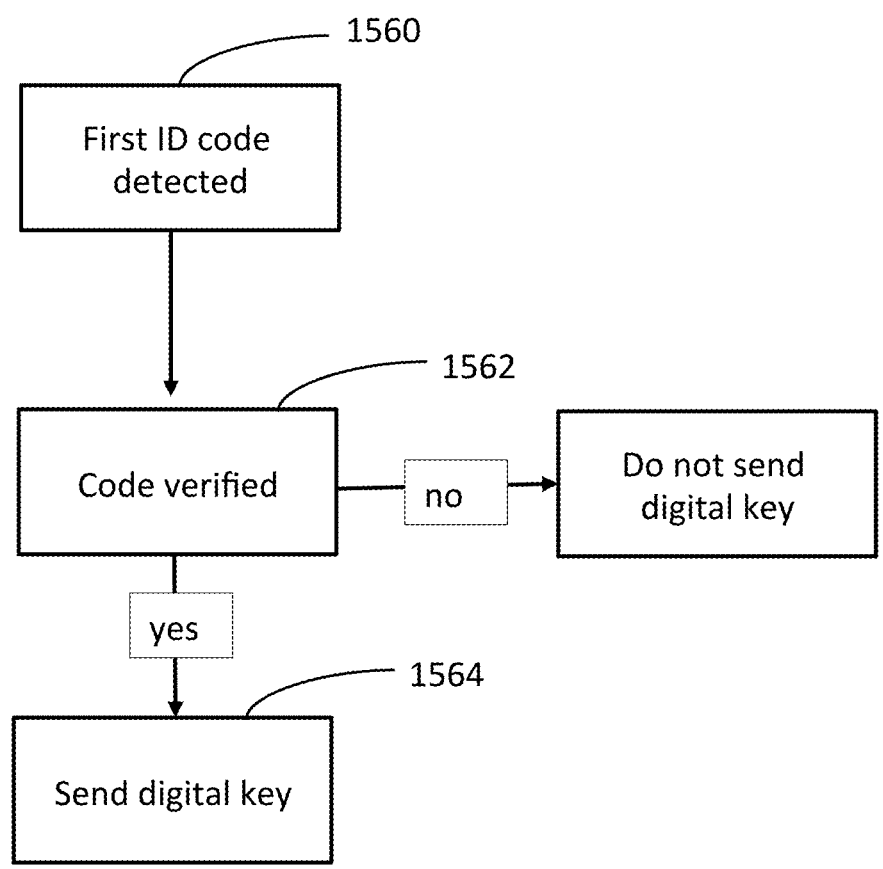
FIG. 25 illustrates a schematic of a method of verifying and sending a digital key, according to some embodiments.

Referring now to FIG. 25, the system detects a first identification code 1560 from the remote computing device. Then the system verifies 1562 that the first identification code is indicative of the remote computing device being authorized for deliveries. The system may then send the digital key 1564 to the remote computing device in response to detecting the first identification code 1560 and in response to verifying the first identification code 1562. The identification code may be a digital identification code sent wirelessly or may be a physical identification code, i.e., a badge or a bar code. Verifying the first identification code 1562 may include checking the code against a database of valid codes stored in the lock and/or doorbell, or stored remotely. For example in the cloud or on a server to see if the code is valid. The first identification code may be detected by at least one of the doorbell and the lock system.

The door 254 can be a garage door that is configured to open in response to detecting an authorized delivery parcel. A garage door opener can be configured to receive a wireless communication configured to cause the garage door opener to open the garage at least part way in response to the system (which can be any system described herein and/or incorporated by reference) determining that the delivery parcel is an expected and/or authorized delivery parcel. The system can determine that the delivery parcel is expected and/or authorized by analyzing an identification code of the delivery parcel."

"A garage door opening system can comprise a parcel identification detection system, which can comprise a camera, scanner, and/or RFID receiver configured to detect a delivery parcel identification code of a delivery parcel. The garage door opening system can comprise a garage door opener configured to open a garage door; and a first computer system configured to receive the delivery parcel identification code detected by the parcel identification detection system, compare the delivery parcel identification code to a first database comprising at least one expected delivery identification code, and send a first communication to the garage door opener in response to determining that the delivery parcel identification code is indicative of the delivery parcel being an expected delivery. The garage door opener can be configured to open the garage door at least partially in response to the first communication. The first computer system can be communicatively coupled to the parcel detection system and the garage door opener. The parcel identification detection system can be coupled to a building that comprises the garage door. A doorbell system can comprise the parcel identification detection system."

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "can," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a delivery parcel detection system, the method comprising:
    sending a digital key to a remote computing device of a delivery person in response to a first time being at least one of within an expected delivery time window and within a predetermined period prior to the expected delivery time window, wherein the digital key is configured to enable unlocking a door of a building to which a delivery parcel is addressed, wherein the door comprises a lock system configured to impede unauthorized entry into the building;
    detecting, by at least one of a doorbell and the lock system, the digital key via a first wireless communication from the remote computing device to at least one of the doorbell and the lock system;
    receiving, by at least one of the doorbell and the lock system, a delivery parcel identification code of the delivery parcel; and
    unlocking the door in response to detecting the digital key, receiving the delivery parcel identification code, and verifying that the delivery parcel identification code corresponds to an expected delivery time.

2. The method of claim 1, further comprising enabling the digital key.

3. The method of claim 1, further comprising disabling the digital key in response to a second time being past the expected delivery time window.

4. The method of claim 1, further comprising unlocking the door in response to verifying that the delivery parcel identification code corresponds to an expected delivery item.

5. The method of claim 1, further comprising recording a video, by the doorbell, in response to detecting the delivery person and in response to determining that the delivery parcel is an expected delivery item.

6. The method of claim 5, further comprising saving the video and labeling the video as a delivery such that the labeling indicates to a doorbell user that the video shows the delivery of at least one item.

7. The method of claim 1, further comprising detecting a first location of the remote computing device and sending the digital key to the remote computing device in response to the first location.

8. The method of claim 7, further comprising sending the digital key to the remote computing device in response to the first location being within one mile of at least one of the doorbell and the lock system.

9. The method of claim 1, further comprising sending the digital key to the remote computing device in response to the first location being within a direct wireless communication range of at least one of the doorbell and the lock system.

10. The method of claim 7, further comprising detecting, by at least one of the doorbell and the lock system, a delivery parcel identification code of the delivery parcel, and unlocking the door in response to both detecting the digital key and detecting the delivery parcel identification code.

11. The method of claim 1, further comprising detecting a first location of a delivery vehicle and sending the digital key to the remote computing device in response to the first location.

12. The method of claim 1, further comprising detecting a first identification code from the remote computing device, verifying that the first identification code is indicative of the remote computing device being authorized for deliveries, and sending the digital key to the remote computing device in response to detecting the first identification code and in response to verifying the first identification code.

13. The method of claim 12, further comprising detecting the first identification code by at least one of the doorbell and the lock system.

14. The method of claim 12, further comprising recording a video by the doorbell, determining that the video shows a delivery, and labeling the video such that the labeling indicates to a doorbell user that the video shows the delivery of at least one item.

15. The method of claim 14, further comprising sending the video to an entity associated with sending the delivery parcel.

16. A method of using a delivery parcel detection system, the method comprising:
    detecting a first location of a remote computing device of a delivery person and sending the digital key to the remote computing device in response to the first location;
    sending a digital key to the remote computing device in response to the first location being within a direct wireless communication range of at least one of a doorbell and a lock system, wherein the digital key is configured to enable unlocking a door of a building to which a delivery parcel is addressed, wherein the door comprises the lock system configured to impede unauthorized entry into the building;
    detecting, by at least one of the doorbell and the lock system, the digital key via a first wireless communication from the remote computing device to at least one of the doorbell and the lock system; and
    unlocking the door to permit the delivery person to place the delivery parcel inside the building in response to detecting the digital key.

17. The method of claim 16, further comprising detecting, by at least one of the doorbell and the lock system, a delivery parcel identification code of the delivery parcel, and unlocking the door in response to both detecting the digital key and detecting the delivery parcel identification code.

18. The method of claim 16, further comprising recording a video by the doorbell, determining that the video shows a delivery, and labeling the video such that the labeling indicates to a doorbell user that the video shows the delivery of at least one item.

19. The method of claim 18, further comprising sending the video to an entity associated with sending the delivery parcel.

20. The method of claim 16, further comprising detecting a first identification code from the remote computing device, verifying that the first identification code is indicative of the remote computing device being authorized for deliveries, and sending the digital key to the remote computing device in response to detecting the first identification code and in response to verifying the first identification code.

21. The method of claim 20, further comprising detecting the first identification code by at least one of the doorbell and the lock system.

22. A method of using a delivery parcel detection system, the method comprising:
- detecting a first location of a remote computing device of a delivery person;
- sending a digital key to the remote computing device in response to the first location being within a direct wireless communication range of at least one of a doorbell and a lock system and in response to a first time being at least one of within an expected delivery time window and within a predetermined period prior to the expected delivery time window, wherein the digital key is configured to enable unlocking a door of a building to which a delivery parcel is addressed;
- detecting, by at least one of the doorbell and the lock system, the digital key via a first wireless communication from the remote computing device to at least one of the doorbell and the lock system;
- receiving, by at least one of the doorbell and the lock system, a delivery parcel identification code of the delivery parcel; and
- unlocking the door in response to detecting the digital key, receiving the delivery parcel identification code, and verifying that the delivery parcel identification code corresponds to the expected delivery time window.

23. The method of claim 22, further comprising recording a video, by the doorbell, in response to detecting the delivery person and in response to determining that the delivery parcel is an expected delivery item.

24. The method of claim 23, further comprising saving the video and labeling the video as a delivery such that the labeling indicates to a doorbell user that the video shows the delivery of at least one item.

25. The method of claim 23, further comprising sending the video to an entity associated with sending the delivery parcel.

26. The method of claim 22, wherein the delivery parcel comprises an expected delivery time window, the method further comprising disabling the digital key in response to a second time being past the expected delivery time window.

27. The method of claim 22, further comprising detecting a first location of a delivery vehicle and sending the digital key to the remote computing device in response to the first location.

28. The method of claim 22, further comprising detecting a first identification code from the remote computing device, verifying that the first identification code is indicative of the remote computing device being authorized for deliveries, and sending the digital key to the remote computing device in response to detecting the first identification code and in response to verifying the first identification code.

29. The method of claim 28, further comprising detecting the first identification code by at least one of the doorbell and the lock system.

* * * * *